(12) United States Patent
Miyasaka et al.

(10) Patent No.: US 8,599,484 B2
(45) Date of Patent: Dec. 3, 2013

(54) DIFFRACTIVE OPTICAL ELEMENT AND MEASURING DEVICE

(75) Inventors: Koji Miyasaka, Fukushima (JP); Takuji Nomura, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 217 days.

(21) Appl. No.: 13/206,100

(22) Filed: Aug. 9, 2011

(65) Prior Publication Data
US 2012/0038934 A1 Feb. 16, 2012

(30) Foreign Application Priority Data
Aug. 10, 2010 (JP) ................................. 2010-179655

(51) Int. Cl.
*G02B 27/44* (2006.01)
*G01N 21/55* (2006.01)

(52) U.S. Cl.
USPC ............ 359/569; 359/572; 359/566; 356/603

(58) Field of Classification Search
USPC .......... 359/569, 558, 566, 572; 356/601–623; 382/106, 154
See application file for complete search history.

(56) References Cited

U.S. PATENT DOCUMENTS

| | | | |
|---|---|---|---|
| 6,101,269 A | | 8/2000 | Hunter et al. |
| 6,690,474 B1 * | | 2/2004 | Shirley ........................... 356/603 |
| 7,170,611 B2 * | | 1/2007 | Millerd et al. ................. 356/491 |
| 7,375,801 B1 * | | 5/2008 | Briscoe et al. ................. 356/3.1 |
| 7,835,081 B2 * | | 11/2010 | Ozeki ........................... 359/574 |
| 8,050,461 B2 * | | 11/2011 | Shpunt et al. ................. 382/106 |
| 8,494,252 B2 * | | 7/2013 | Freedman et al. ............ 382/154 |
| 2009/0096783 A1 | | 4/2009 | Shpunt et al. |
| 2011/0169915 A1 * | | 7/2011 | Bloom et al. .................. 348/46 |
| 2012/0050713 A1 * | | 3/2012 | Inoue ........................... 356/3.11 |
| 2012/0050717 A1 * | | 3/2012 | Inoue ........................... 356/4.01 |
| 2013/0050710 A1 * | | 2/2013 | Yamaguchi et al. .......... 356/610 |

FOREIGN PATENT DOCUMENTS

| | | |
|---|---|---|
| JP | 2009-531655 | 9/2009 |
| WO | WO 2007/105205 A2 | 9/2007 |
| WO | WO 2007/105205 A3 | 9/2007 |

OTHER PUBLICATIONS

U.S. Appl. No. 13/285,204, filed Oct. 31, 2011, Miyasaka, et al.
U.S. Appl. No. 13/407,108, filed Feb. 28, 2012, Miyasaka.
U.S. Appl. No. 13/760,831, filed Feb. 6, 2013, Miyasaka, et al.

* cited by examiner

*Primary Examiner* — Hoa Pham
(74) *Attorney, Agent, or Firm* — Oblon, Spivak, McClelland, Maier & Neustadt, L.L.P.

(57) ABSTRACT

To provide a diffractive optical element and a measuring device capable of generating light spots of dispersive type. The problem is resolved by providing a diffractive optical element having concaves and convexes and diffracting incident light in two dimensions so as to generate diffracted light, wherein when the number of a part of light spots formed by the diffracted light is denoted by n, an average distance W to the nearest neighbor in the light spots normalized by an area of a region onto which the light spots are projected falls within a range of $1/(2 \times n^{1/2}) < W < 1/(n^{1/2})$.

10 Claims, 20 Drawing Sheets

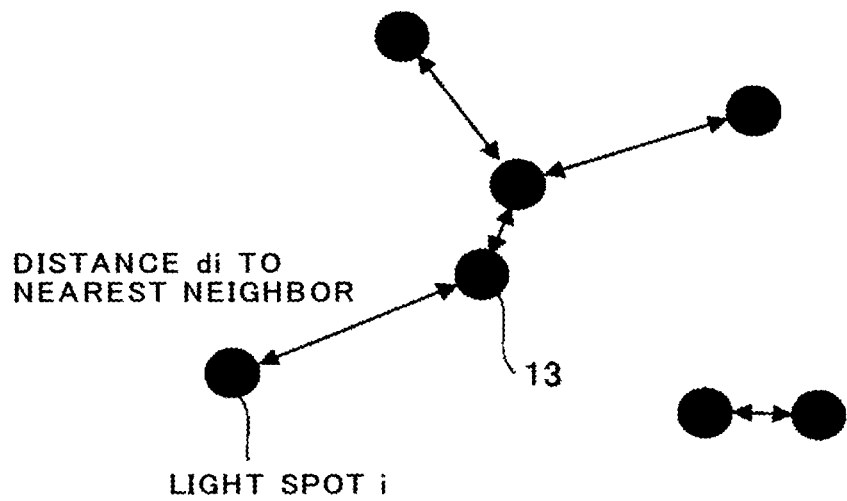

FIG. 12
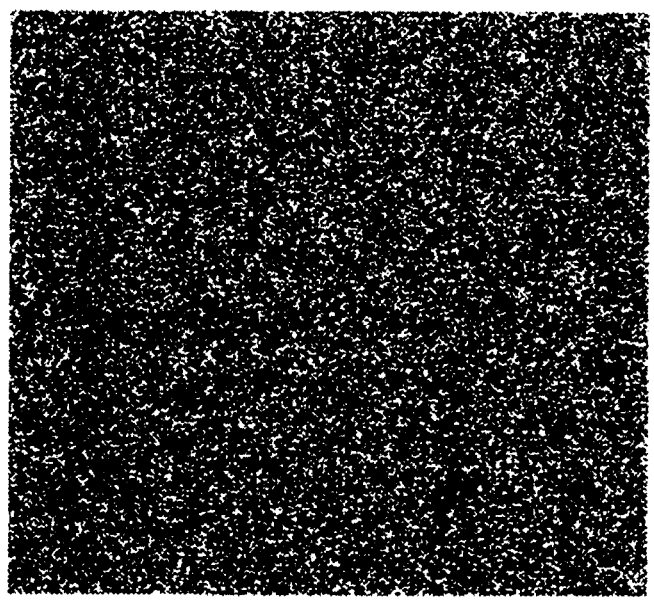
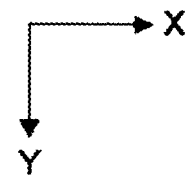

FIG. 14
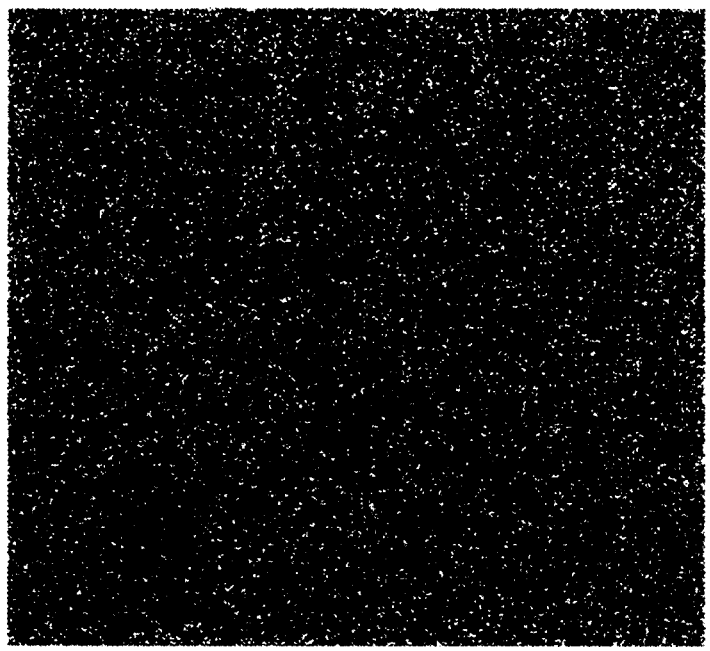
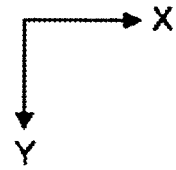

FIG. 16
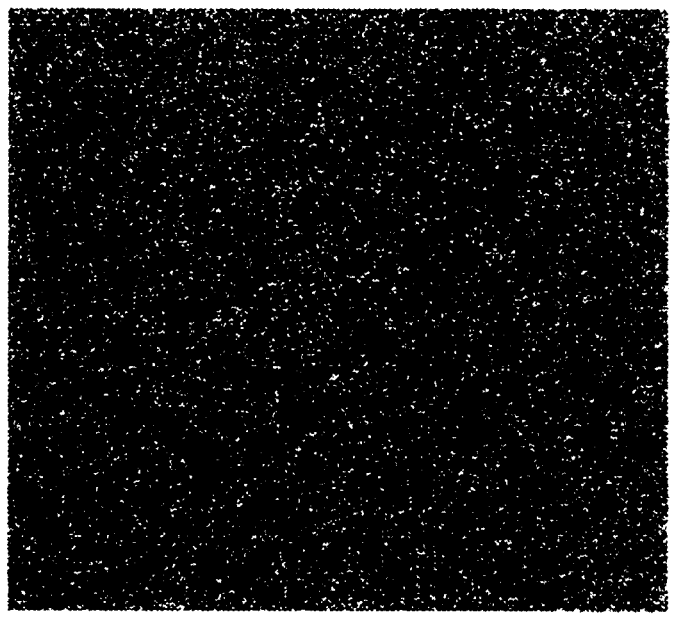
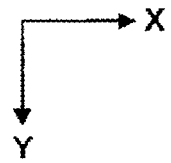

DIFFRACTIVE OPTICAL ELEMENT AND MEASURING DEVICE

BACKGROUND

1. Field of the Invention

The present invention relates to a diffractive optical element and a measuring device employing this diffractive optical element.

2. Description of the Related Art

Diffractive optical elements for diffracting at least a part of incident light are used in various kinds of optical devices, optical apparatuses, and the like. An optical three-dimensional measuring device serving as an example of such optical apparatuses projects a predetermined projection pattern of light onto a measurement object, then acquires an image of the measurement object onto which the predetermined projection pattern of light is projected, and thereby performs three-dimensional measurement. In such a three-dimensional measuring device, a diffractive optical element is used for generating such a predetermined projection pattern of light.

U.S. Pat. No. 6,101,269 and JP-A-2009-531655 disclose methods of projecting a speckle pattern generated by a diffractive optical element as a projection pattern of light to be projected onto the measurement object in three-dimensional measurement.

Nevertheless, in such a speckle pattern, light spots of strong intensity are generated at random positions on the projection plane. Thus, density inhomogeneity of light spots arises in the within-the-plane distribution on the projection plane. Thus, in a region onto which light spots in the speckle pattern are not projected, three-dimensional information is not acquired and hence accurate three-dimensional measurement is not achieved. This has caused a problem of degradation in the resolution of the three-dimensional measuring device.

SUMMARY

The present invention has been devised in view of the above-mentioned situation. An object of the invention is to provide a diffractive optical element in which generation of a large region onto which no light spot is projected is avoided and hence density inhomogeneity of light spots is suppressed, and further to provide a measuring device capable of performing accurate measurement.

According to the invention, there is provided a diffractive optical element having concaves and convexes and diffracting incident light in two dimensions so as to generate diffracted light, wherein when the number of a part or a whole of light spots formed by the diffracted light is denoted by n, an average distance W to the nearest neighbor in the light spots normalized by an area of a region onto which the light spots are projected falls within a range of $1/(2 \times n^{1/2}) < W < 1/(n^{1/2})$.

The diffractive optical element of the invention, the region onto which the light spots are projected is a plane region or a spherical surface region.

The diffractive optical element of the invention, the concaves and convexes are formed in the shape of two steps or alternatively three or more steps.

The diffractive optical element of the invention, the diffracted light is transmission diffraction light of light having been incident onto the diffractive optical element, or alternatively the diffractive optical element has a reflecting layer composed of a material for reflecting light and the diffracted light is reflected light reflected by the reflecting layer.

A measuring device of the invention, there is provided a measuring device including: a light source; and an image pickup section for acquiring an image of a measurement object onto which light is projected, wherein light from the light source is branched and then when the number of a part or a whole of light spots formed by the branched light beams is denoted by n, an average distance W to the nearest neighbor in the light spots normalized by an area of a region onto which the light spots are projected falls within a range of $1/(2 \times n^{1/2}) < W < 1/(n^{1/2})$.

The measuring device of the invention, there is provided a measuring device including: a light source; and an image pickup section for acquiring an image of a measurement object onto which light is projected, wherein light from the light source is branched and then when the number of a part or a whole of light spots formed by the branched light beams is denoted by n, an average distance W to the nearest neighbor in the light spots normalized by an area of a region onto which the light spots are projected falls within a range of $1/(2 \times n^{1/2}) < W < 1/(n^{1/2})$, and wherein the diffractive optical element described above is employed for diffracting the light from the light source so as to form the light spots.

The measuring device of the invention, the average distance W to the nearest neighbor is calculated from an image obtained by the image pickup section.

A measuring device of the invention, the number of the light spots is 100 or greater.

According to the present invention, a diffractive optical element is provided in which generation of a large region onto which no light spot is projected is avoided and hence density inhomogeneity of light spots is suppressed. Further, a measuring device capable of performing accurate measurement is provided.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 6 is an explanation diagram showing a method of distance to the nearest neighbor;

FIG. 12 is an explanation diagram of a diffractive optical element according to Example 1;

FIG. 14 is an explanation diagram of a diffractive optical element according to Example 2;

FIG. 16 is an explanation diagram of a diffractive optical element according to Example 3;

DETAILED DESCRIPTION OF THE INVENTION

Figure 1:
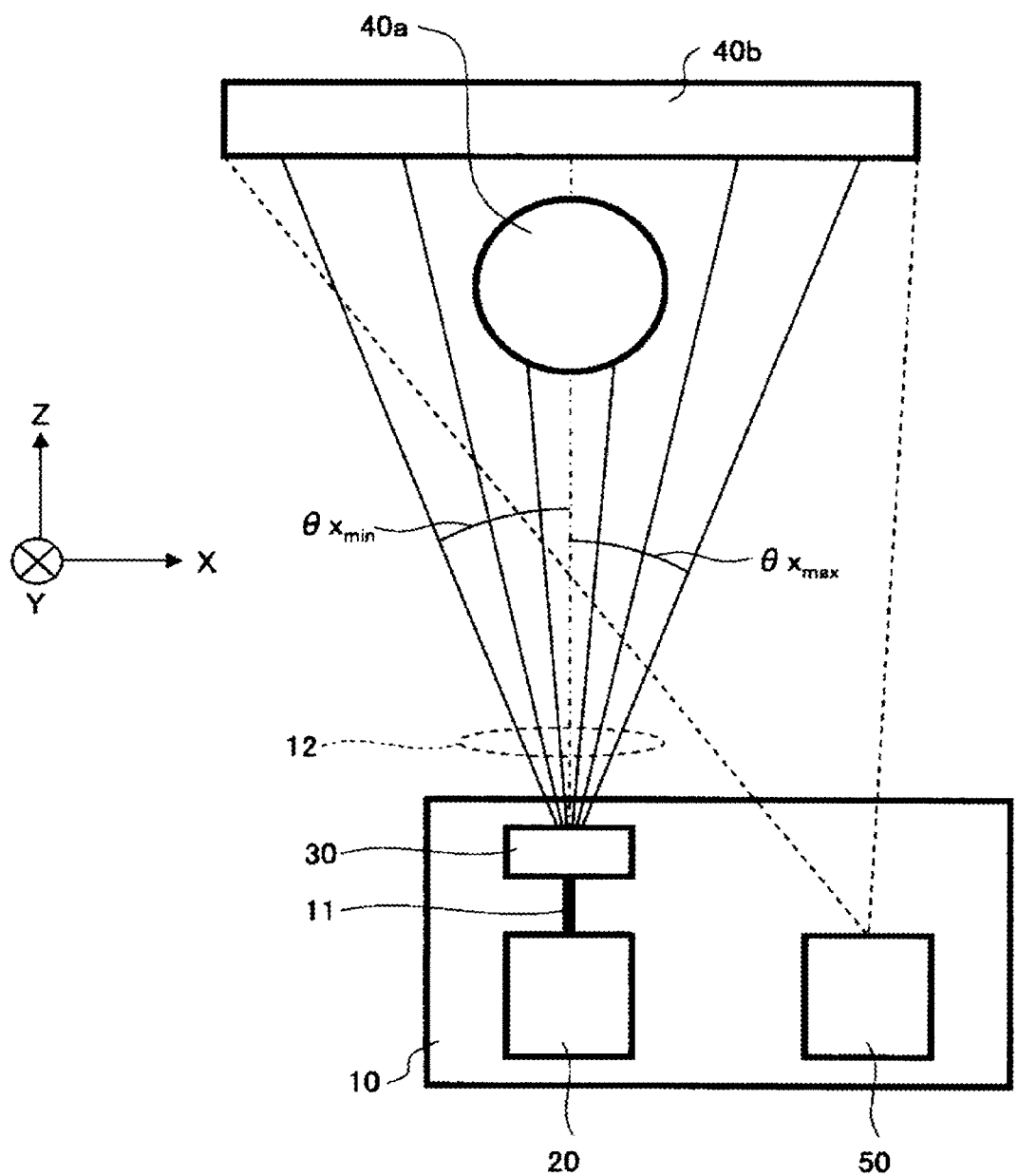
FIG. 1 is a structure diagram of a measuring device according to an embodiment.

A mode of implementing the present invention is described below. Here, like members and the like are designated by like reference numerals, and hence their description is omitted.

(Measuring Device)

A measuring device according to the present embodiment is described below. FIG. 1 shows an exemplary configuration of the measuring device according to the present embodiment. The measuring device 10 according to the present embodiment has a light source 20, a diffractive optical element 30, and an image sensor 50. When a light beam (incident light) 11 emitted from the light source 20 enters into the diffractive optical element 30, diffracted light beams 12 are generated. Further, the image sensor 50 acquires an image of measurement objects 40a and 40b onto which a projection pattern of light spots generated by the diffracted light beams 12 is projected. Here, the image sensor 50 is referred to as an image pickup section in some cases.

As described above, the diffractive optical element 30 generates a plurality of diffracted light beams 12. Then, a desired projection pattern is formed by light spots generated by the diffracted light beams 12. Then, the projection pattern is projected onto the measurement objects 40a and 40b and then their image is acquired by the image sensor 50, so that information like the three-dimensional shapes of the measurement objects 40a and 40b is acquired. Here, for the purpose of three-dimensional measurement, it is preferable that the number of light spots is 100 or greater. Further, in the measuring device 10 shown in FIG. 1, in place of the diffractive optical element 30, a combination between a pattern generating source such as a liquid crystal display panel and a projection lens for projecting the pattern may be provided at the position of the diffractive optical element 30 so that the predetermined pattern may be generated.

Further, in the measuring device 10 employing the diffractive optical element 30, in a configuration that predetermined measurement is achieved even when the distance between the measuring device and the measuring object is short, size reduction is allowed in the measurement optical system. Further, since the optical path length to the light receiving system is allowed to be reduced, a high measurement sensitivity is obtained. Thus, when a diffractive optical element is to be employed in such a measuring device, it is preferable that the later-described angle range of the diffractive optical element 30 is large.

(Diffractive Optical Element)

Next, the diffractive optical element 30 is described below The diffractive optical element 30 is designed such that the diffracted light beams 12 emitted in correspondence to the incident light beam 11 should have two-dimensional distribution. When the direction of the optical axis of the light beam 11 incident onto the diffractive optical element 30 is adopted as the Z-axis and two axes perpendicular to the Z-axis are adopted as the X-axis and the Y-axis, the light beams are distributed in the angle range from the minimum angle $\theta x_{min}$ to the maximum angle $\theta x_{max}$ in the X-axis direction and in the angle range from the minimum angle $\theta y_{min}$ to the maximum angle $\theta y_m$ in the Y-axis direction (not shown). Here, the ranges onto which the diffracted light beams 12 are projected and which extend from the minimum angle $\theta x_{min}$ to the maximum angle $\theta x_{max}$ in the X-axis direction and from the minimum angle $\theta y_{min}$ to the maximum angle $\theta y_{max}$ in the Y-axis direction approximately agree with the image-pickup ranges in the image sensor 50. Further, when each angle range is 15° or greater, size reduction is achieved in the optical system by virtue of the above-mentioned reason and hence such a situation is preferable. Here, the expression "each angle range is 15° or greater" described here is applied to the values of $|\theta x_{max} - \theta x_{min}|$ and $|\theta y_{max} - \theta y_{min}|$.

Further, in a case that the cross section of the diffractive optical element 30 is fabricated in a shape other than a continuous blaze shape, or alternatively in a case that although the cross section has, for example, a blaze shape, fabrication variation occurs, stray light is generated other than the desired diffracted light in some cases. However, such stray light is not desired diffracted light and hence should not be included in the light distributed in the above-mentioned angle ranges. At that time, it is preferable that the formation is such that the intensity of stray light is 70% or lower of the average intensity of the desired diffracted light. Further, it is preferable that the formation is such that the total value of the intensity of the desired diffracted light is 50% or higher of the intensity of the light incident onto the diffractive optical element 30. This permits generation of a projection pattern with a high light utilization efficiency.

Figure 2:
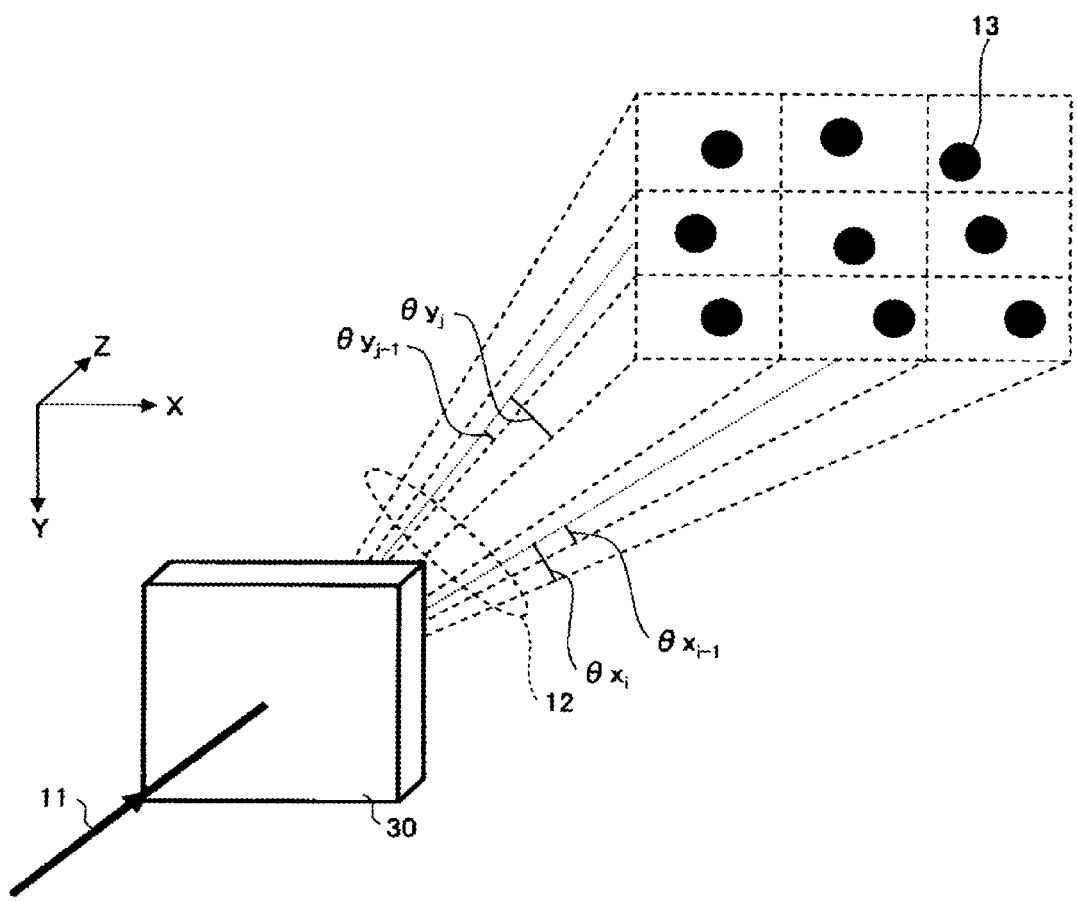
FIG. 2 is an explanation diagram showing a diffractive optical element according to an embodiment.

FIG. 2 is a schematic diagram describing the relation between the diffracted light beams 12 diffracted by the diffractive optical element 30 and the light spots 13 generated thereby. When the light beam 11 serving as incident light enters the diffractive optical element 30, each diffracted light beam 12 is light having one light beam in the angle range from $\theta x_{i-1}$ to $\theta x_i$ in the X-axis direction and in the angle range from $\theta y_{j-1}$ to $\theta y_j$ in the Y-axis direction with reference to the Z-axis direction in the formulas shown in Mathematical Expression 1. The diffracted light beam 12 is projected onto a screen or a measurement object so as to form a light spot 13 at the site of projection.

$$\sin \theta x_i = \sin \theta x_{i-1} + \alpha(\lambda)$$

$$\sin \theta y_j = \sin \theta y_{j-1} + \beta(\lambda) \qquad \text{[Mathematical Expression 1]}$$

The above-mentioned angle ranges $\theta x_{i-1}$ to $\theta x_i$ and $\theta y_{j-1}$ to $\theta y_j$ are obtained by dividing into N the angle range from the minimum angle $\theta x_{min}$ to the maximum angle $\theta x_{max}$ in the X-axis direction and dividing into M the angle range from the minimum angle $\theta y_{min}$ to the maximum angle $\theta y_{max}$ in the Y-axis direction. Then, the relation expressions shown in the following Mathematical Expression 2 are satisfied.

$$\theta x_{min} = \theta x_0 \; \theta y_{min} = \theta y_0$$

$$\sin \theta x_i = \sin \theta x_{min} + i \times \alpha(\lambda)$$

$$\sin \theta y_j = \sin \theta y_{min} + j \times \beta(\lambda)$$

$$\sin \theta x_{max} = \sin \theta x_{min} + N \times \alpha(\lambda)$$

$$\sin \theta y_{max} = \sin \theta y_{min} + M \times \beta(\lambda) \quad \text{[Mathematical Expression 2]}$$

Here, it is assumed that $\theta x_i$ and $\theta y_j$ are distributed at equal angular intervals to each other. However, when the angle in the X-axis direction is denoted by $\theta x$ while the angle in the Y-axis direction is denoted by $\theta y$ and such a configuration is adopted that, for example, diffracted light is not generated at $\theta x = 0$, the above-mentioned angle intervals deviate from the predetermined intervals, that is, become uneven, in some cases. In this case, it is sufficient that $\theta x_{min1}$ and $\theta x_{max1}$ defined in the range of $\theta x < 0$ and $\theta x_{min2}$ and $\theta x_{max2}$ are defined in the range of $\theta x > 0$ such that then the formulas shown in Mathematical Expression 1 are satisfied in the angle ranges of $\theta x_{min1}$ to $\theta x_{max1}$ and $\theta x_{min2}$ to $\theta x_{max2}$. Such an approach of treating unevenness is similarly applicable to $\theta y$. Then, it is preferable that this approach is applied to such angles that the interval deviates from the predetermined interval at ten or less angles in the angle ranges from $\theta x_{min}$ to $\theta x_{max}$ and from $\theta y_{min}$ to $\theta y_{max}$ regardless of the signs of and $\theta x$ and $\theta y$. This is because when unevenness occurs at a larger number of angles, light spot distribution becomes sparse at a larger number of regions and hence the resolution is degraded in the measuring device.

The diffractive optical element 30 for emitting the diffracted light beams 12 as described here may be constructed from a diffractive optical element designed by using iterative Fourier transformation or the like. Here, the diffractive optical element indicates an element where basic units for generating particular phase distribution are arranged periodically, for example, in two dimensions. In such a diffractive optical element, the distribution of the diffraction orders of the diffracted light at a distant position is obtained by Fourier transformation in the basic unit. This fact is described by scalar diffraction theory. The electromagnetic field is a vector quantity, but is expressed by a scalar quantity in an isotropic medium. Then, the scalar function $u(P, t_m)$ at time $t_m$ and point P is expressed by the formula shown in Mathematical Expression 3.

$$u(P,t_m) = Re[U(P)\exp(-i\omega t_m)] \quad \text{[Mathematical Expression 3]}$$

Here, the formula shown in Mathematical Expression 3 describes a case that the incident light is monochromatic. U(P) denotes the complex amplitude at point P, and u denotes the frequency. The scalar function shown in Mathematical Expression 3 satisfies the wave equation shown in Mathematical Expression 4 in the entire space.

$$\nabla^2 u - \frac{1}{c^2} \frac{\partial^2 u}{\partial r^2} = 0 \quad \text{[Mathematical Expression 4]}$$

When the formula shown in Mathematical Expression 3 is substituted into the formula shown in Mathematical Expression 4, the Helmholtz equation shown in Mathematical Expression 5 is obtained.

$$(\nabla^2 + k^2)u = 0 \quad \text{[Mathematical Expression 5]}$$

Here, k is the wave number and defined by $k = 2\pi/\lambda$. Then, when the equation shown in Mathematical Expression 5 is solved, the distribution of the scalar function in the space is obtained. Further, when a sufficiently thin two-dimensional flat screen that provides particular phase distribution is denoted by $\Sigma$, a point on $\Sigma$ is denoted by $P_1$, and the scalar function at point $P_0$ at the time that a plane wave passes through $\Sigma$ is calculated from the formula shown in Mathematical Expression 5 by using Kirchhoff's boundary condition, the formula shown in Mathematical Expression 6 is obtained where $r_{01}$ denotes the distance from point $P_0$ to point $P_1$.

$$u(P_0) \propto \int\int_\Sigma u(P_1) \frac{e^{ikr_{01}}}{r_{01}} dS \quad \text{[Mathematical Expression 6]}$$

When it is assumed that the coordinates of point $P_0$ are $(x_0, y_0, z)$, that the coordinates of point $P_1$ are $(x_1, y_1, z)$, and that z has a value sufficiently greater than $|x_0 - x_1|$ and $|y_0 - y_1|$, the Fraunhofer-approximated formula shown in Mathematical Expression 7 is obtained by expansion of $r_{01}$.

$$u(x_0, y_0) \propto \iint_\Sigma u(x_1, y_1) e^{-i(k/z)(x_0 x_1 + y_0 y_1)} dS \quad \text{[Mathematical Expression 7]}$$

This corresponds to the Fourier transformation of the phase distribution imparted by the screen. In particular, when the phase distribution $u(P_1)$ after the screen has periodicity of a pitch $P_x$ in the X-axis direction and a pitch $P_y$ in the Y-axis direction, in $u(P_0)$, diffracted light of $(m, n)$-th order is generated as shown in the following formulas shown in Mathematical Expression 8.

$$\sin \theta x_{out} = \sin \theta x_{in} + m \times \lambda / Px$$

$$\sin \theta y_{out} = \sin \theta y_{in} + n \times \lambda / Py \quad \text{[Mathematical Expression 8]}$$

At that time, the diffraction efficiency $\eta_{mn}$ for the diffracted light of $(m, n)$-th order is expressed by the following formula shown in Mathematical Expression 9 by using the phase distribution $u'(x_1, y_1)$ owned by the basic unit having periodicity. Here, m and n are integers. Symbols $\theta x_{in}$ and $\theta y_{in}$ denote the angles relative to the Z-axis in the X-direction and the Y-direction of the incident light. Symbols $\theta x_{out}$ and $\theta y_{out}$ denote the angles relative to the Z-axis in the X-direction and the Y-direction of the exiting light.

$$\eta_{mn} \propto |\int_0^{Px} \int_0^{Py} u'(x_1, y_1) e^{-i(2\pi mx_1/Px + 2\pi ny_1/Py)} dS|^2 \quad \text{[Mathematical Expression 9]}$$

Thus, when the phase distribution of the basic unit is obtained, the intensity distribution in the diffracted light is calculated by Fourier transformation. Thus, when the phase distribution of the basic unit is optimized, a diffractive optical element is obtained that generates diffracted light having desired distribution.

Figure 3A:
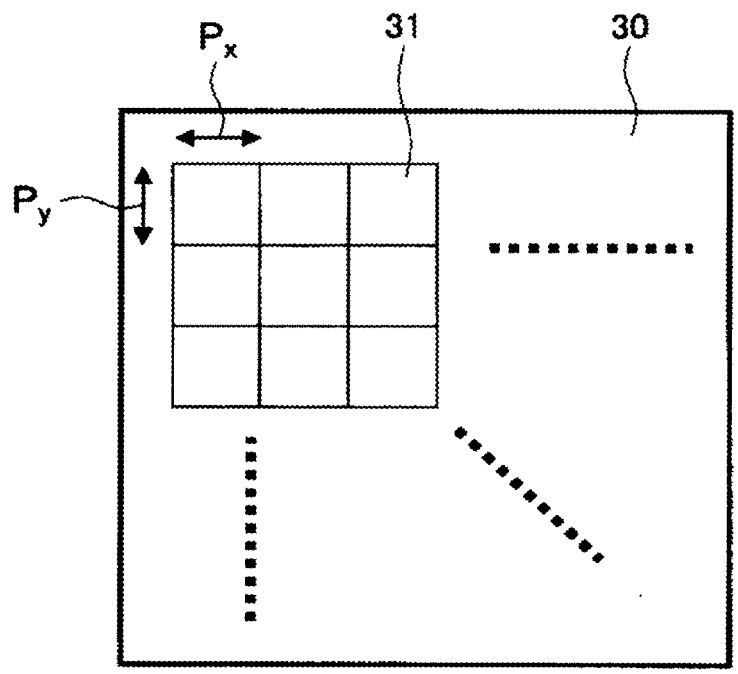
FIGS. 3A and 3B are structure diagrams of a diffractive optical element according to an embodiment.
Figure 3B:
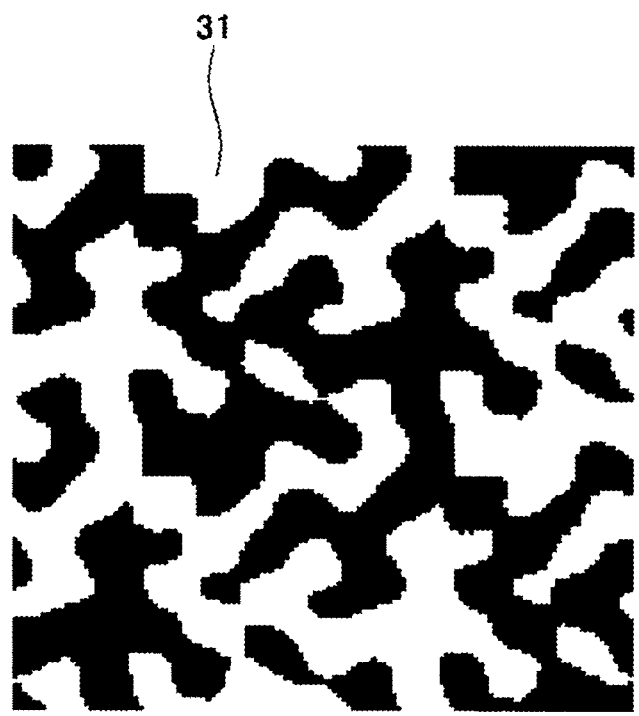

Next, the diffractive optical element 30 according to the present embodiment is described below with reference to FIGS. 3A and 3B. The diffractive optical element 30 is constructed from basic units 31 arranged periodically in two dimensions with a pitch $P_x$ in the X-axis direction and a pitch $P_y$ in the Y-axis direction as shown in FIG. 3A. Then, each basic unit 31 has phase distribution, for example, as shown in FIG. 3B. That is, in the surface of the basic unit 31, a concave and concex pattern is formed where a black part corresponds to a convex and a white part corresponds to a concave as shown in FIG. 3B. The diffractive optical element according to the present embodiment may be of any type as long as appropriate phase distribution is generated, and may have a structure that a concave and convex pattern is formed on the surface of a light-transmitting material such as glass and resin materials, a structure obtained when a plurality of materials having mutually different refractive indices are bonded to each other and then physical concaves and convexes in the surface are flattened, or alternatively a structure that the refractive index is varied. That is, concaves and convexes described here may be an arbitrary structure capable of imparting a phase difference to the incident light beam, and is not limited to a surface shape having concaves and convexes.

Figure 4:
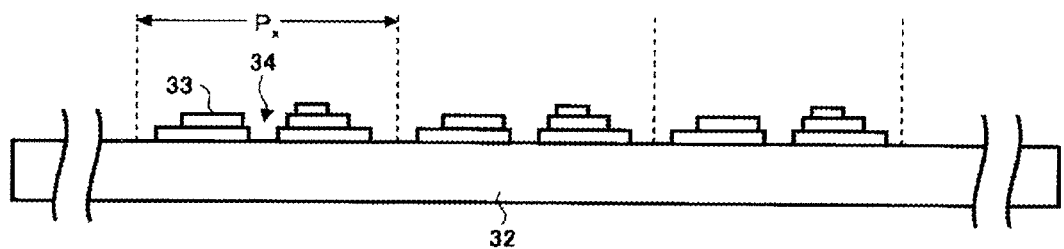
FIG. 4 is a structure diagram of a diffractive optical element according to an embodiment.

FIG. 4 is a schematic cross sectional view of the diffractive optical element 30 having a structure that convexes 33 are formed in the surface of a substrate 32 composed of glass or the like, which serves as an example of the diffractive optical element according to the present embodiment. In this diffractive optical element 30, in the surface of the substrate 32, a region where a convex 33 is not formed serves as a concave 34.

The transparent substrate 32 may be composed of a material of any kind such as a resin plate and a resin film as long as the material is transparent to the incident light. However, when optically isotropic material such as glass and quartz is employed, an influence of birefringence is not imparted to the transmitted light. Thus, such a configuration is preferable. Further, in the transparent substrate 32, for example, when an antireflection film composed of a multilayer film is provided in the interface with air, a light reflection loss caused by Fresnel reflection is reduced.

Figure 5:
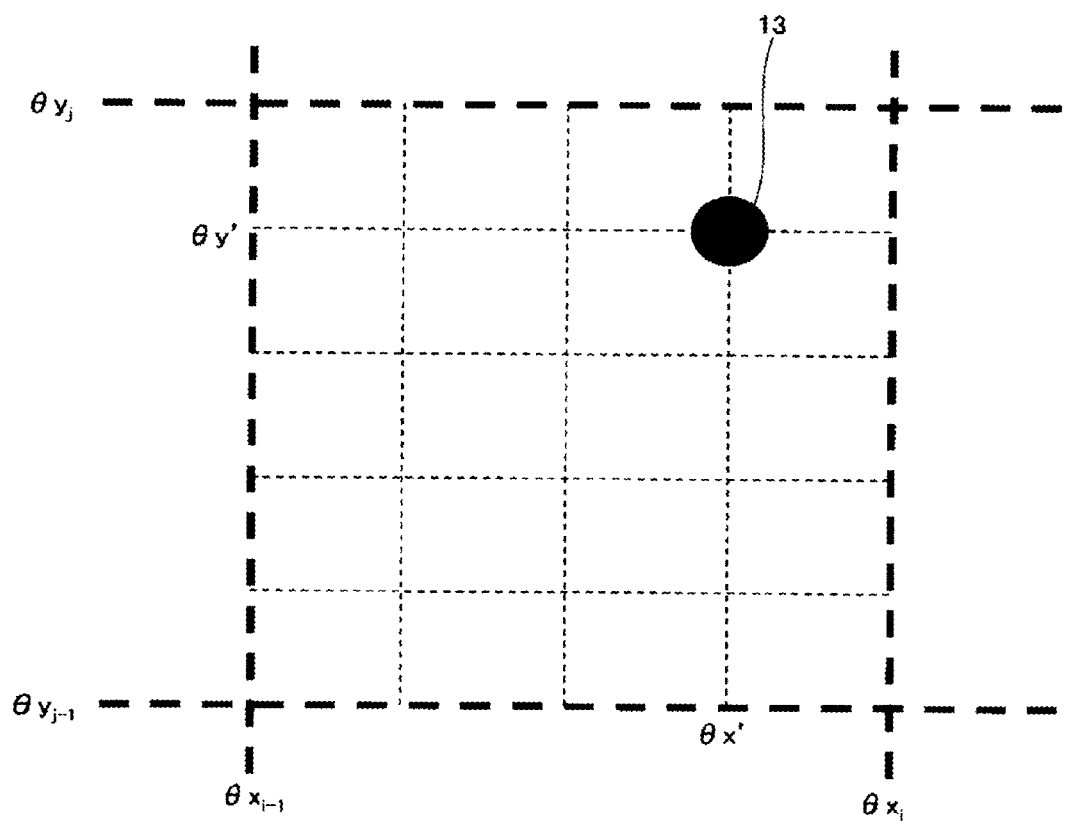
FIG. 5 is an explanation diagram showing light spots of diffracted light generated by a diffractive optical element according to an embodiment.

As shown in FIG. 5, the diffractive optical element 30 is formed such that when angle ranges $\theta x_{i-1}$ to $\theta x_i$ and $\theta y_{j-1}$ to $\theta y_j$ are given, a light spot 13 generated by one diffracted light beam is projected within the two-dimensional angle ranges. That is, FIG. 5 depicts a plane approximately perpendicular to the direction of traveling of one diffracted light beam. Then, on this plane, the region contained in the angle ranges $\theta x_{i-1}$ to $\theta x_i$ and $\theta y_{j-1}$ to $\theta y_j$ is defined as a grid. Then, within this grid, sub-grids are supposed that are obtained by further dividing in the X- and Y-angle directions. Then, the light spot 13 of one diffracted light beam is located in this sub-grid. When the number of dividing is N' in the X-angle direction and M' in the −Y-angle direction, the angles $\theta x'$ and $\theta y'$ of the diffracted light in the X-direction and the Y-direction satisfy the following formulas shown in Mathematical Expression 10. Here, from the formulas shown in Mathematical Expressions 1, 2, 8, and 10, $\alpha(\lambda)=N'\times\lambda/P_x$ and $\beta(\lambda)=M'\times\lambda/P_x$ are obtained.

$$\sin\theta x' = \sin\theta x_{i-1} + \lambda/Px \times a(a=0 \sim N'-1)$$

$$\sin\theta y' = \sin\theta x_{i-1} + \lambda/Py \times b(b=0 \sim M'-1) \quad \text{[Mathematical Expression 10]}$$

When one diffracted light beam is imparted to one grid as described here, in the entirety, light spots generated by diffracted light beams of a fixed number are projected onto a region of a fixed area. This permits rather uniform distribution of light spots in the projection pattern, and hence a pattern of dispersive type is obtained.

Further, the number of diffracted light beams imparted to one grid is not limited to unity and may be plural. Similarly to the above-mentioned case, when in one grid, the number of dividing is N' in the X-angle direction and M' in the −Y-angle direction and the number of light spots imparted to one grid is p (p is a natural number), it is sufficient that $0<p\leq N'\times M'/2$ are satisfied. It is more preferable when $0<p\leq N'\times M'/4$ are satisfied. Further, when $N'\geq 3$ and $M'\geq 3$, it is sufficient that $0<p\leq N'\times M'/9$ are satisfied.

Besides, the numbers of light spots, imparted to each grids, may be different from each other without large vary of the number of light spots among the grids. To prevent the increase in variability among the numbers of light spots imparted to each grids, it is preferable that the number of light spots in one grid p is fallen inside the range: $1/2\times p\_avg \leq p \leq 3/2\times p\_avg$, and it is more preferable that the p is fallen inside the range: $3/4\times p\_avg \leq p \leq 5/4\times p\_avg$, when the average of the numbers of light spots imparted to each grids is p_avg. In the above, the projection area is divided to grid areas, and the light spots are assigned to each grids, the uniformity of the projected light spots is obtained. However, the option of designing the projected light spots is not limited to the above. For example, the desired value of the distance to the nearest neighbor, as referred in hereinafter, can be used for designing the projected light spots. It is possible to calculate the spot distribution by setting the distance between the light spots adjacent to the desired value of the distance to the nearest neighbor. According to the above, the average value of the distance to the nearest neighbor becomes the above-mentioned desired value, and the spot distribution, which has the uniformity of the light spot density corresponding to the distance to the nearest neighbor, can be obtained.

As described above, the diffractive optical element according to the present embodiment is fabricated in accordance with a design obtained by using a technique such as iterative Fourier transformation. Specifically, the phase distribution of the basic unit in the diffractive optical element and the electric field distribution of diffracted light are in the relation of Fourier transform of each other. Thus, when inverse Fourier transformation is performed on the electric field distribution of diffracted light, the phase distribution of the basic unit is obtained.

Further, in the fabrication of the diffractive optical element, the intensity distribution of diffracted light is the only restriction and the phase is not contained in the restriction. Thus, the phase distribution of the basic unit may be arbitrary. In the iterative Fourier transformation, information on the phase distribution of the basic unit is extracted from the inverse Fourier transform of the intensity distribution of diffracted light. Then, with adopting the obtained phase distribution as the phase distribution of the basic unit, Fourier transformation is performed further. As such, with adopting as the evaluation value the difference between the result of the Fourier transformation and the intensity distribution of the desired diffracted light, the above-mentioned calculation is repeated. As a result, the phase distribution of the diffractive optical element that realizes a minimum evaluation value is obtained as the optimal design.

An employable design algorithm for the diffractive optical element is not limited to this. Otherwise, various kinds of techniques are known as described, for example, in Bernard Kress and Patrick Meyrueis, "Digital Diffractive Optics" (translation from Maruzen). Here, the employed method of Fourier transformation may be a Fast Fourier Transformation algorithm.

Meanwhile, in the diffractive optical element according to the present embodiment, a feature is to employ a method of distance to the nearest neighbor or a technique of space analyses such as the K-function and the L-function based on the distribution of the obtained light spots. Details of this are described below.

(Method of Distance to the Nearest Neighbor)

First, the method of distance to the nearest neighbor is described below. The distance to the nearest neighbor indicates the distance from each light spot to a light spot nearest to this on a particular plane. FIG. 6 is a conceptual diagram for this. The average distance W to the nearest neighbor indicates the average of the distances to the nearest neighbor. The distance $d_i$ to the nearest neighbor indicates the distance to the nearest light spot 13 located at the closest distance from a light spot i, and n denotes the number of light spots. Then, calculation is performed by the following formula shown in Mathematical Expression 11.

$$W = \frac{1}{n}\sum_{i=1}^{n} d_i \qquad \text{[Mathematical Expression 11]}$$

Figure 7A:
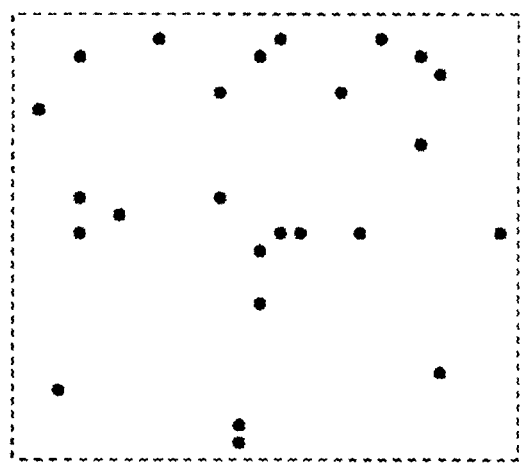
FIGS. 7A to 7C are explanation diagrams showing distribution of light spots.

Here, as shown in FIG. 7A, it is assumed that light spots are distributed at random (in accordance with uniform Poisson distribution) within an area S on an arbitrary plane. In this case, the expected value E[W] for the average distance W to the nearest neighbor is expressed by the following formula shown in Mathematical Expression 12. Here, when light spots are regularly arranged at regular intervals, the distance $W_0$ is expressed by the formula shown in Mathematical Expression 13.

$$E[W] \approx \frac{1}{2\sqrt{n/S}} \qquad \text{[Mathematical Expression 12]}$$

$$W_0 = \frac{1}{\sqrt{n/S}} \qquad \text{[Mathematical Expression 13]}$$

Figure 7B:
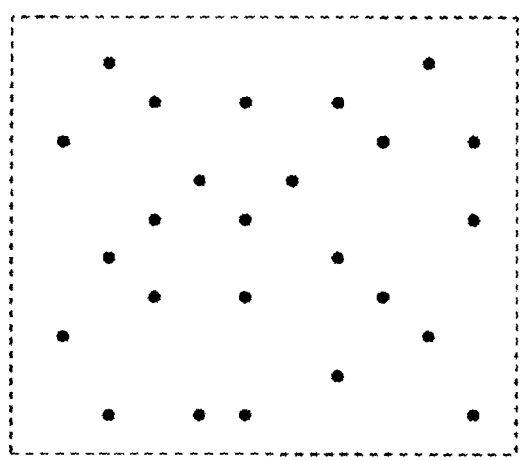
Figure 7C:
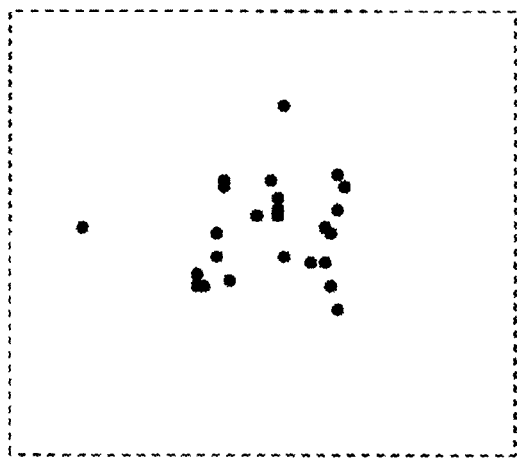

Further, when light spots are dispersively distributed on the plane of area S as shown in FIG. 7B, W>E[W] holds. In the case of concentrative distribution on the plane of area S as shown in FIG. 7C, W<E[W] holds. That is, according to the method of distance to the nearest neighbor, when the average distance W to the nearest neighbor of the given distribution of the light spots is calculated and then compared with the expected value E[W] for the average distance to the nearest neighbor in the case of random distribution, the property of the distribution of light spots is recognized. Specifically, it is preferable that the light spots are distributed in dispersive type as shown in FIG. 7B. Further, it is preferable that the light spots are not regularly arranged at regular intervals.

Thus, in the diffractive optical element according to the present embodiment, the average distance W to the nearest neighbor in the light spots as shown in Mathematical Expression 11 falls within the range expressed by the formula shown in Mathematical Expression 14. Further, when normalized by the area S, the average distance W to the nearest neighbor falls within the range expressed by the formula shown in Mathematical Expression 15. Here, the range of average distance W to the nearest neighbor in the diffractive optical element according to the present embodiment shown in Mathematical Expression 15 is expressed also as $1/(2\times n^{1/2})<W<1/(n^{1/2})$.

$$\frac{1}{2\sqrt{n/S}} < W < \frac{1}{\sqrt{n/S}} \qquad \text{[Mathematical Expression 14]}$$

$$\frac{1}{2\sqrt{n}} < W < \frac{1}{\sqrt{n}} \qquad \text{[Mathematical Expression 15]}$$

(K-Function and L-Function)

Next, the K-function and the L-function are described below. In the method of distance to the nearest neighbor, distribution is evaluated on the basis of the distance values between light spots on a particular plane. In the K-function and the L-function, distribution is evaluated by considering a predetermined area and then calculating the number of light spots contained within the area. Here, the value of the K-function is calculated by the formula shown in Mathematical Expression 16. Here, $d_{ij}$ denotes the distance from a light spot i to a light spot j, and $I(d_{ij}<t)$ indicates the number of light spots contained within a distance t.

$$K(t) = \frac{\sum_i \sum_{j \neq i} I(d_{ij} < t)}{n(n/S)} \qquad \text{[Mathematical Expression 16]}$$

The L-function is obtained by standardizing the K-function for the purpose of removing the influences of the number of points and the density, and calculated by the formula shown in Mathematical Expression 17.

$$L(t) = \sqrt{\frac{K(t)}{\pi}} - t \qquad \text{[Mathematical Expression 17]}$$

In the K-function, evaluation is performed for a range wider than that in the method of distance to the nearest neighbor. Thus, this approach is useful when the order of concentration or dispersion of the distribution is to be determined on a particular scale. For example, in a three-dimensional measuring device, in a case that a projected pattern is present only within a particular range on an image taking plane, the distribution of light spots may be evaluated by using such a function. When the distribution of light spots is at random, the expected value E[K(t)] for the K-function is expressed by the formula shown in Mathematical Expression 18.

$$E[K(t)] = \pi t^2 \qquad \text{[Mathematical Expression 18]}$$

Figure 8:
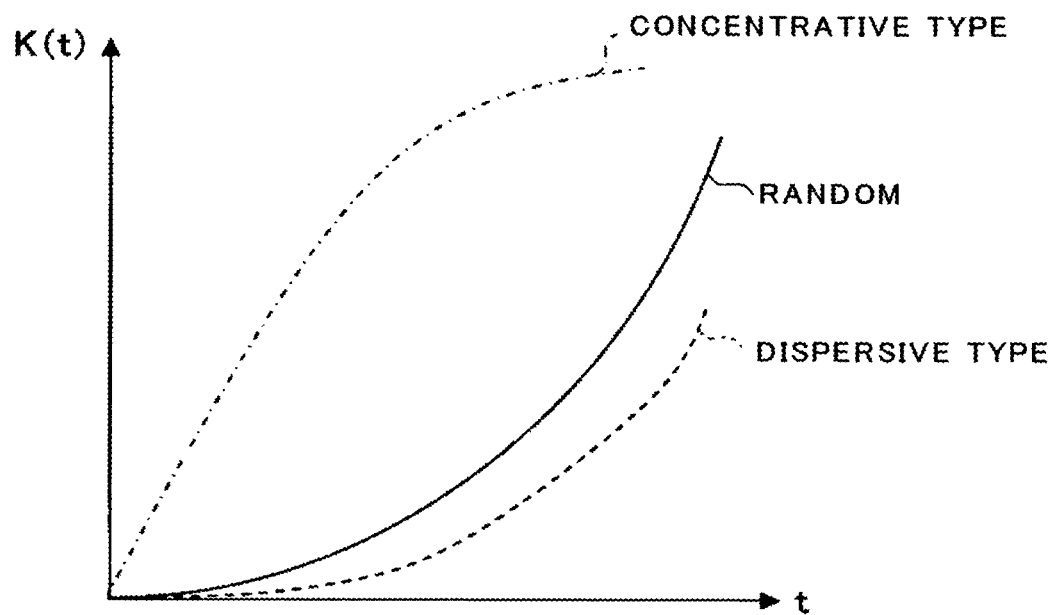
FIG. 8 is a correlation diagram for distance and K-function.

Thus, when the value of the K-function calculated with a circle scale of radius t satisfies $K(t)>\pi t^2$, the distribution of light spots is concentrative. In the case of $K(t)<\pi t^2$, the distribution of light spots has a tendency of being dispersive. FIG. 8 shows these situations schematically. Similarly, when evaluation is performed by using the L-function, E[L(t)]=0 holds for a random pattern. In the case of L(t)>0, concentrative distribution of light spots is indicated, and in the case of L(t)<0, dispersive distribution of light spots is indicated.

Figure 9:
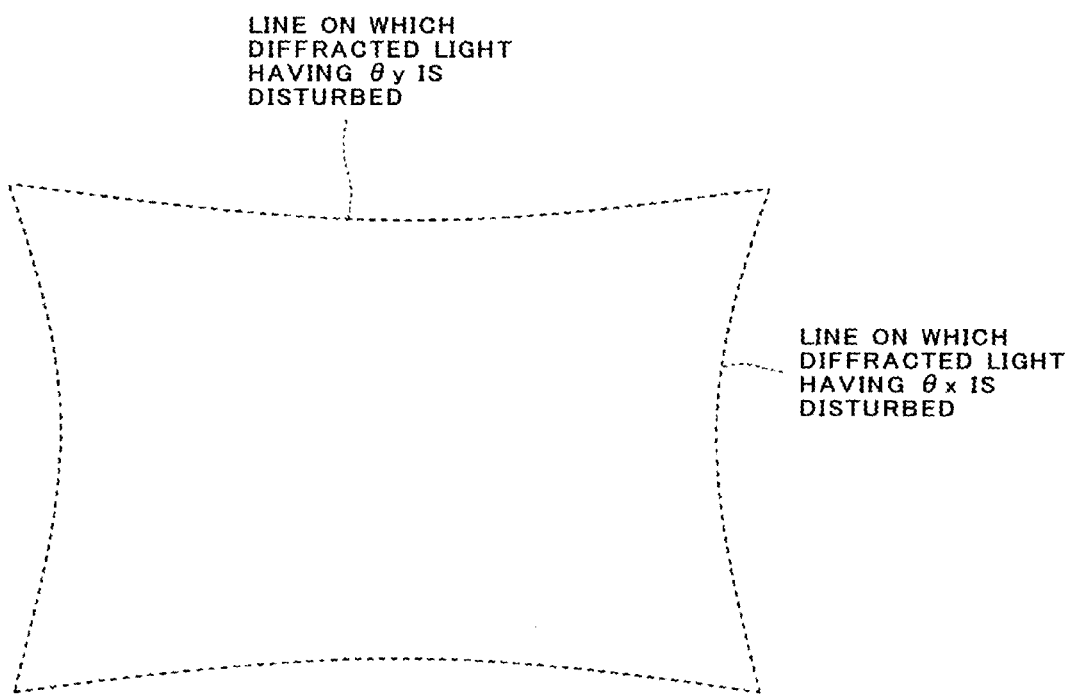
FIG. 9 is a schematic diagram describing actual distribution of diffracted light.

As described above, the distribution of light spots can be evaluated by the method of distance to the nearest neighbor or the K-function. However, in order that the evaluation should be achieved free from the dependence on the size of the projection plane, it is preferable that evaluation of the above-mentioned value is performed by using a normalized distance obtained when the area of the region where the light spots are present on the projection plane is regarded as unity. Further, when a pattern of light spots is projected onto a projection plane separated from the diffractive optical element by a fixed distance, a light spot having a diffraction angle θ is projected at a position of a distance z×tan θ measured from the point where the optical axis intersects with the projection plane. Thus, the distance of the point at which the light spot is projected is not exactly proportional to the diffraction angle θ. That is, the diffracted light distribution has a pincushion shape as schematically shown in FIG. 9. In this case, the pattern of light spots obtained by projection onto a screen of spherical surface or the like whose center is located at the diffractive optical element may be analyzed so that evaluation of the distribution is achieved free from the influence of the distortion in the projection pattern.

In a case that the diffractive optical element 30 for generating light spots having pincushion-type distortion as shown in FIG. 9 is to be employed in the measuring device 10, the image-pickup region of the image sensor 50 in the measuring device 10 does not agree with the region where light spots are generated by the diffractive optical element 30, in some cases. Further, in some other cases, the image-pickup region of the image sensor 50 does not agree with the region where light spots are generated by the diffractive optical element 30. Thus, the diffractive optical element 30 may be designed such that Mathematical Expression 14 is satisfied when the number of light spots contained in the region of at least a part of the region where the diffracted light is generated is denoted by n. At that time, it is preferable that the region where n light spots are generated occupies 50% or greater of the region where light spots are generated. Occupation of 75% or greater is more preferable. Such a configuration permits efficient utilization of the light spots.

Further, when the diffractive optical element 30 is employed in the measuring device 10, it is preferable that Mathematical Expression 14 is satisfied in a region occupying a half or wider of the area of the image-pickup region of the image sensor 50 in the measuring device 10. Further, it is more preferable that Mathematical Expression 14 is satisfied in the entirety of the image-pickup region. Further, for example, in a case that the image sensor 50 of the measuring device 10 employs a fish-eye lens or alternatively that the projection plane is substantially inclined relative to the diffractive optical element 30, the image on the image sensor 50 is distorted in some cases. In this case, Mathematical Expression 14 may be satisfied on the image detected by the image sensor 50 instead of the projection plane of real space.

This is achieved, for example, by imparting distortion of pincushion type to the distribution of light spots generated by the diffractive optical element 30 in a case that the image sensor 50 employs a fish-eye lens having distortion of barrel type. When spot distribution having distortion of pincushion type in real space is image-taken through such a lens, distortion of barrel type is imparted. In the distribution of light spots to which the distortion of barrel type has been imparted, the distortion of pincushion type present in the distribution of light spots in real space is cancelled out and hence the distribution of light spots on the picked-up image satisfies Mathematical Expression 14.

As described above, in the diffractive optical element according to the present invention, the distribution of light spots is formed such that the light spots are arranged at desired positions. This permits generation of a projection pattern having distribution where variation in the density of light spots is reduced. Further, when such a diffractive optical element is employed, a measuring device is obtained in which unevenness in the density of light spots is adjusted and hence accurate measurement is achieved.

Figure 10:
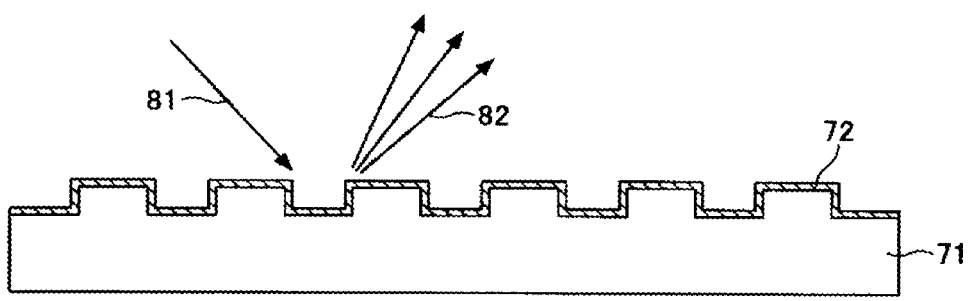
FIG. 10 is a structure diagram of another diffractive optical element according to an embodiment.

Here, the description given above has been made for a transmission-type diffractive optical element that transmits light. Instead, a reflection-type diffractive optical element 70 as shown in FIG. 10 may be employed. Specifically, onto the surface of a substrate 71 provided with concaves and convexes, a metal film 72 such as an Al film having a high reflectivity may be formed by sputtering or vacuum deposition. Then, when incident light 81 enters the diffractive optical element 70, diffracted light 82 is formed by the reflected light. Further, the member for reflecting light may be fabricated from a material other than the metal film 72. For example, a dielectric multilayer film may be employed. Further, the diffractive optical element 70 may have an arbitrary structure as long as diffracted light 82 is generated by the reflected light of incident light 81, including a structure that a reflection film composed of metal or a multilayer film is formed on a flat surface and then concaves and convexes are formed thereon.

EXAMPLES

Example 1

Figure 11A:
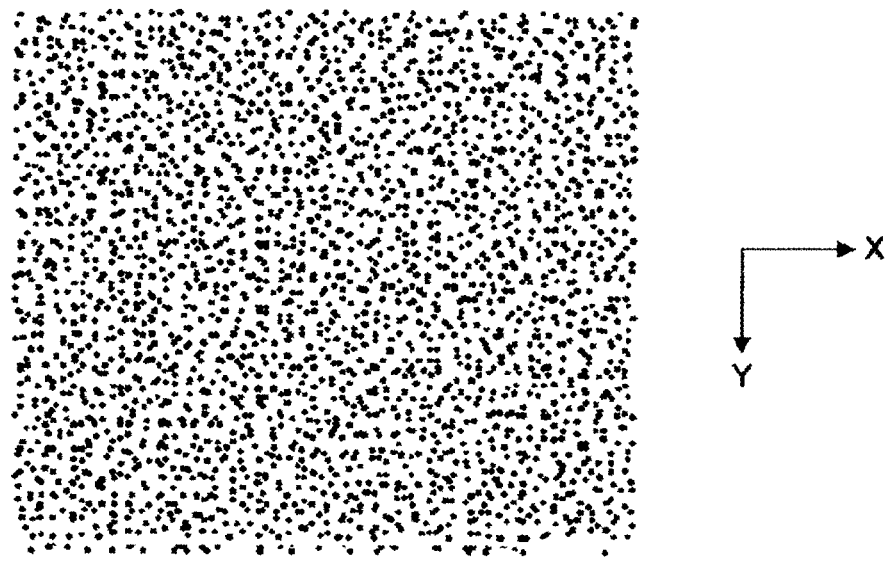
FIGS. 11A and 11B are explanation diagrams of a diffractive optical element according to Example 1.
Figure 11B:
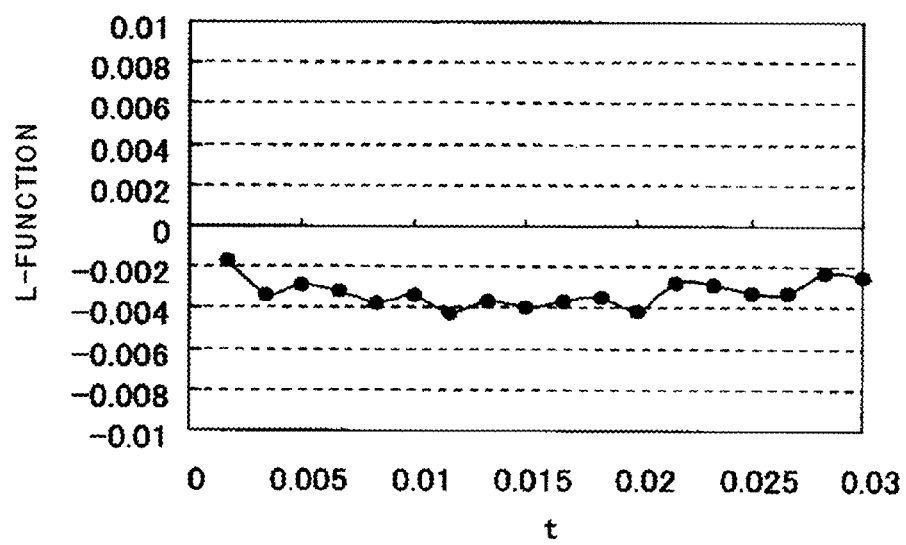

Example 1 is described below with reference to FIGS. 11A, 11B and 12. FIG. 11A shows a situation that a pattern consisting of 2500 light spots of dispersive type is generated by the diffractive optical element according to the present embodiment. In FIG. 11A, the diffractive optical element according to Example 1 is formed such that predetermined diffraction ranges are divided into 50×50 and that one light spot enters into each grid. In particular, the formation is such that each grid is divided into sub-grids of 5×5 and then one light spot is located at random at one of the sub-grids.

Then, when the above-mentioned pattern is applied to the diffracted light of −125th to 124th orders in the X-direction and −125th to 124th orders in the Y-direction and then the phase distribution of the basic unit on the diffractive optical element plane is calculated by iterative Fourier transformation, the diagram shown in FIG. 12 is obtained. In this phase distribution, eight phase values are distributed. Then, on the basis of this, a quartz substrate is processed into the shape of eight steps by photolithography and etching such that basic units having a pitch of 400 μm in the X- and the Y-directions are arranged within the region of 4 mm×4 mm and that the height of each step is 230 nm. As a result, a diffractive optical element is obtained that has the maximum diffraction angle at ±15° in the X-direction for light having a wavelength of 830 nm. Here, in the calculation, a refractive index of 1.46 to 830-nm light is adopted for quartz. This is the same also in the following examples.

Then, after normalization, into 1, of the area of the projection pattern shown in FIG. 11A, the average distance to the nearest neighbor has been calculated to be 0.013. Here, in the present example, the value for $1/(n^{1/2})$ is 0.02, and the average distance to the nearest neighbor of the diffractive optical element according to the present example falls within the range from 0.01 to 0.02. Further, FIG. 11B shows the L-function calculated for the diffractive optical element according to Example 1. The values in the L-function are smaller than 0, and hence indicate distribution of dispersive type.

When the diffractive optical element according to Example 1 described above is incorporated in a measuring device, a high-resolution measuring device is realized.

Example 2

Figure 13A:
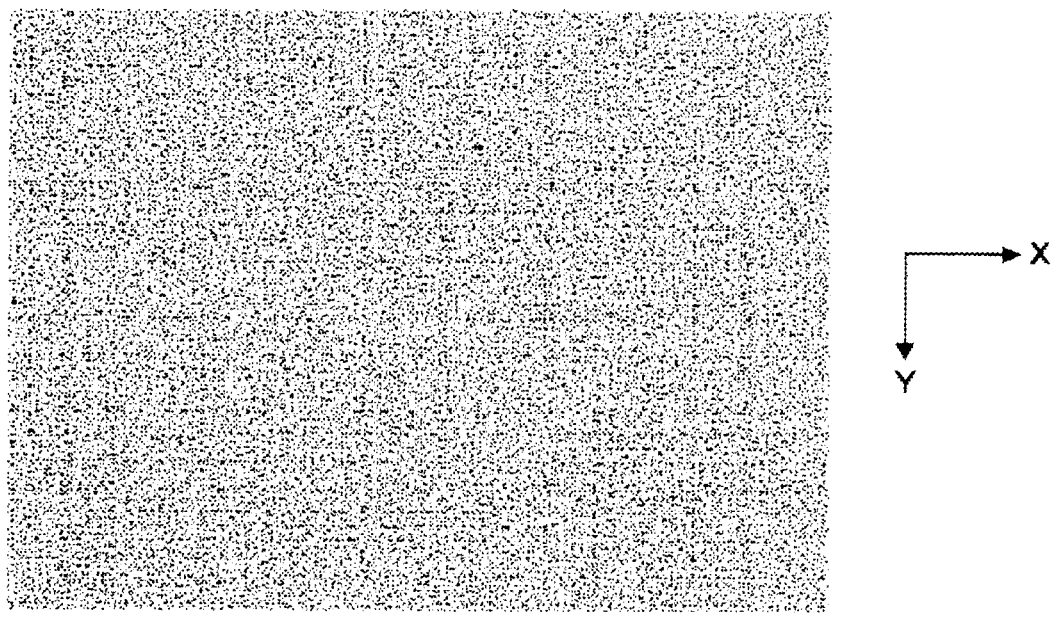
FIGS. 13A and 13B are explanation diagrams of a diffractive optical element according to Example 2.
Figure 13B:
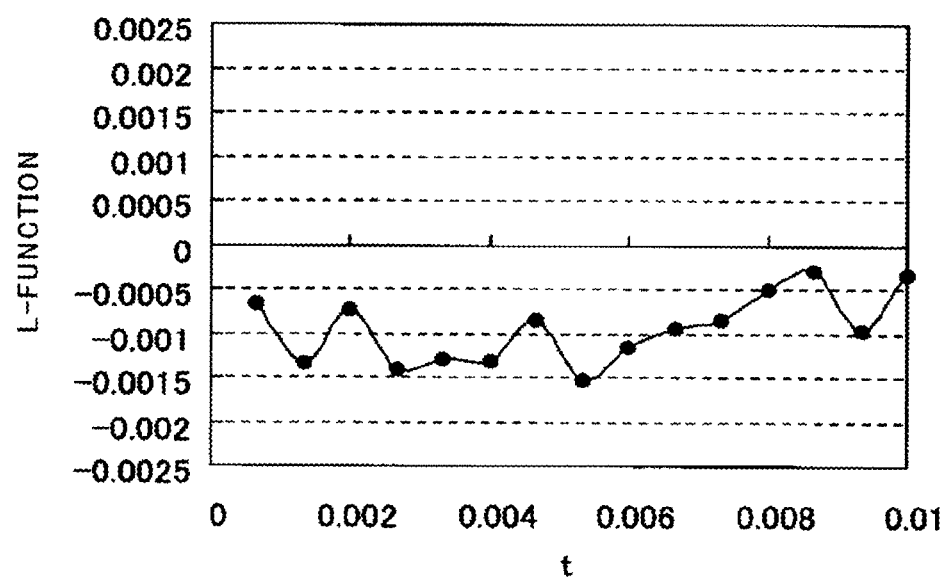

Next, Example 2 is described below with reference to FIGS. 13A, 13B and 14. FIG. 13A shows a situation that a pattern consisting of 30000 light spots of dispersive type is generated by the diffractive optical element according to the present embodiment. In FIG. 13A, the diffractive optical element according to Example 2 is formed such that predetermined diffraction ranges are divided into 200×150 and that one light spot enters into each grid. In particular, the formation is such that each grid is divided into sub-grids of 3×3 and then one light spot is located at random at one of the sub-grids.

Then, when the above-mentioned pattern is applied to the diffracted light of −300th to 299th orders in the X-direction and −225th to 224th orders in the Y-direction and then the phase distribution of the basic unit on the diffractive optical element plane is calculated by iterative Fourier transformation, the diagram shown in FIG. 14 is obtained. In this phase distribution, eight phase values are distributed. Then, on the basis of this, a quartz substrate is processed into the shape of eight steps by photolithography and etching such that basic units having a pitch of 498 µm in the X- and the Y-directions are arranged within the region of 4 mm×4 mm and that the height of each step is 230 nm. As a result, a diffractive optical element is obtained that has the maximum diffraction angle at ±30° in the X-direction for light having a wavelength of 830 nm.

Then, after normalization, into 1, of the area of the projection pattern shown in FIG. 13A, the average distance to the nearest neighbor has been calculated to be 0.0038. Here, in the present example, the value for $1/(n^{1/2})$ is 0.0058, and the average distance to the nearest neighbor of the diffractive optical element according to the present example falls within the range from 0.0029 to 0.0058. Further, FIG. 13B shows the L-function calculated for the diffractive optical element according to Example 2. The values of the L-function are smaller than 0, and hence indicate distribution of dispersive type.

When the diffractive optical element according to Example 2 described above is incorporated in a measuring device, a high-resolution measuring device is realized.

Example 3

Figure 15A:
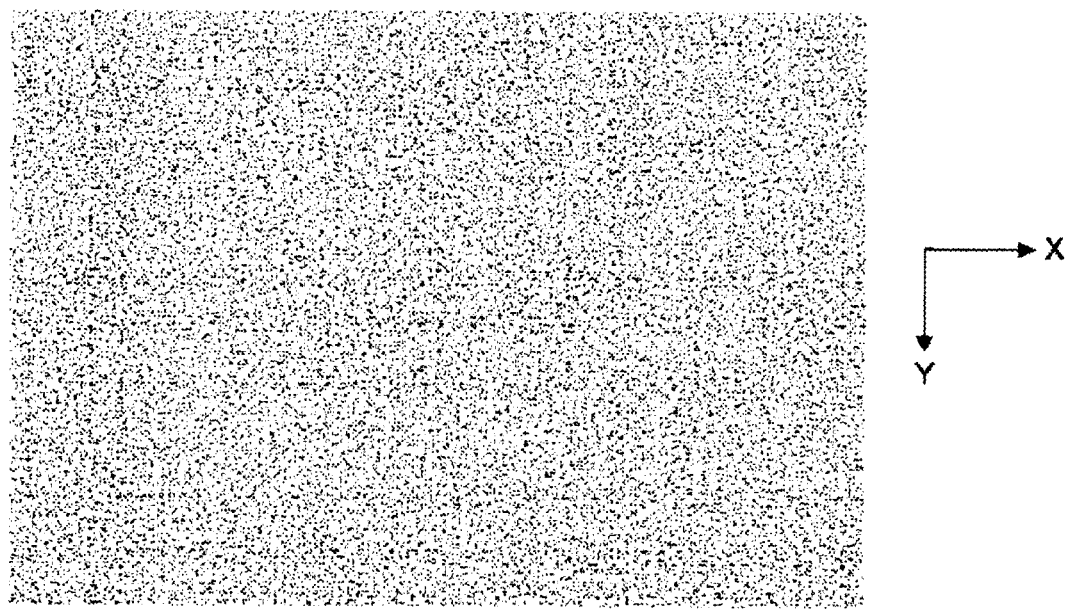
FIGS. 15A and 15B are explanation diagrams of a diffractive optical element according to Example 3.
Figure 15B:
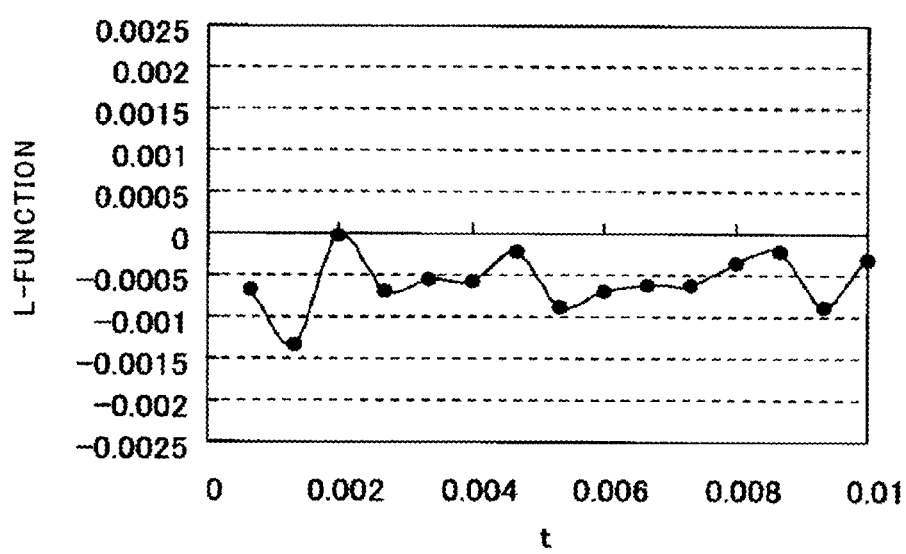

Next, Example 3 is described below with reference to FIGS. 15A, 15B and 16. FIG. 15A shows a situation that a pattern consisting of 30000 light spots of dispersive type is generated by the diffractive optical element according to the present embodiment. In FIG. 15A, the diffractive optical element according to Example 3 is formed such that predetermined diffraction ranges are divided into 100×75 and that four light spots enter into each grid. In particular, the formation is such that each grid is divided into sub-grids of 6×6 and then four light spots are located at random at the sub-grids.

Then, when the above-mentioned pattern is applied to the diffracted light of −300th to 299th orders in the X-direction and −225th to 224th orders in the Y-direction and then the phase distribution of the basic unit on the diffractive optical element plane is calculated by iterative Fourier transformation, the diagram shown in FIG. 16 is obtained. In this phase distribution, eight phase values are distributed. Then, on the basis of this, a quartz substrate is processed into the shape of eight steps by photolithography and etching such that basic units having a pitch of 498 µm in the X- and the Y-directions are arranged within the region of 4 mm×4 mm and that the height of each step is 350 nm. As a result, a diffractive optical element is obtained that has the maximum diffraction angle at ±30° in the X-direction for light having a wavelength of 830 nm.

Then, after normalization, into 1, of the area of the projection pattern shown in FIG. 15A, the average distance to the nearest neighbor has been calculated to be 0.0032. Here, in the present example, the value for $1/(n^{1/2})$ is 0.0058, and the average distance to the nearest neighbor of the diffractive optical element according to the present example falls within the range from 0.0029 to 0.0058. Further, FIG. 15B shows the L-function calculated for the diffractive optical element according to Example 3. The values of the L-function are smaller than 0, and hence indicate distribution of dispersive type.

When the diffractive optical element according to Example 3 described above is incorporated in a measuring device, a high-resolution measuring device is realized.

Comparison Example 1

Figure 17A:
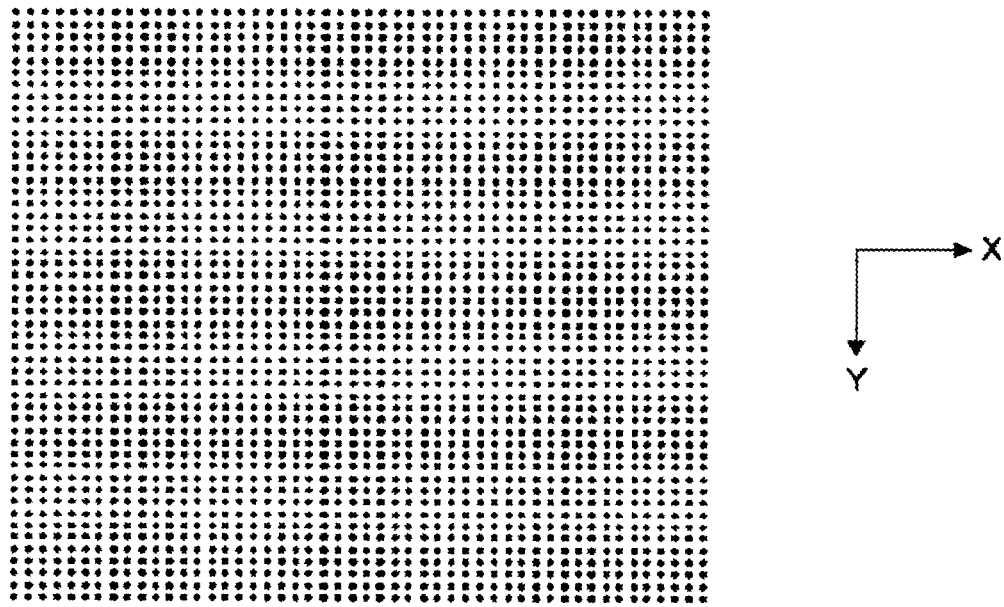
FIGS. 17A and 17B are explanation diagrams showing a diffractive optical element according to Comparison Example 1.
Figure 17B:
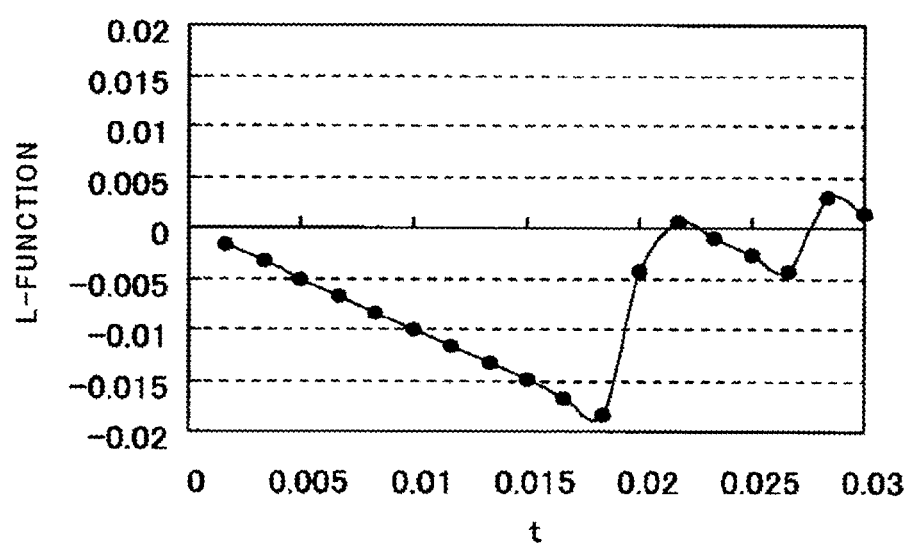

Next, Comparison Example 1 is described below with reference to FIGS. 17A and 17B. FIG. 17A shows a situation that in a diffractive optical element according to Comparison Example 1, 2500 regular light spots are generated at grid points. As shown in FIG. 17A, the diffractive optical element according to Comparison Example 1 is formed such that predetermined diffraction ranges are divided into 50×50 and then one light spots is located at a predetermined position in each grid.

After normalization, into 1, of the area of the projection pattern shown in FIG. 17A, the average distance to the nearest neighbor has been calculated to be 0.02. Here, in the present comparison example, the value for $1/(n^{1/2})$ is 0.02 and agrees with the average distance to the nearest neighbor of the diffractive optical element according to the present comparison example. Further, FIG. 17B shows the L-function calculated for the diffractive optical element according to Comparison Example 1. The values of the L-function are smaller than 0 in the range of t<0.02, and hence indicate distribution of dispersive type in the above-mentioned range.

Comparison Example 2

Figure 18A:
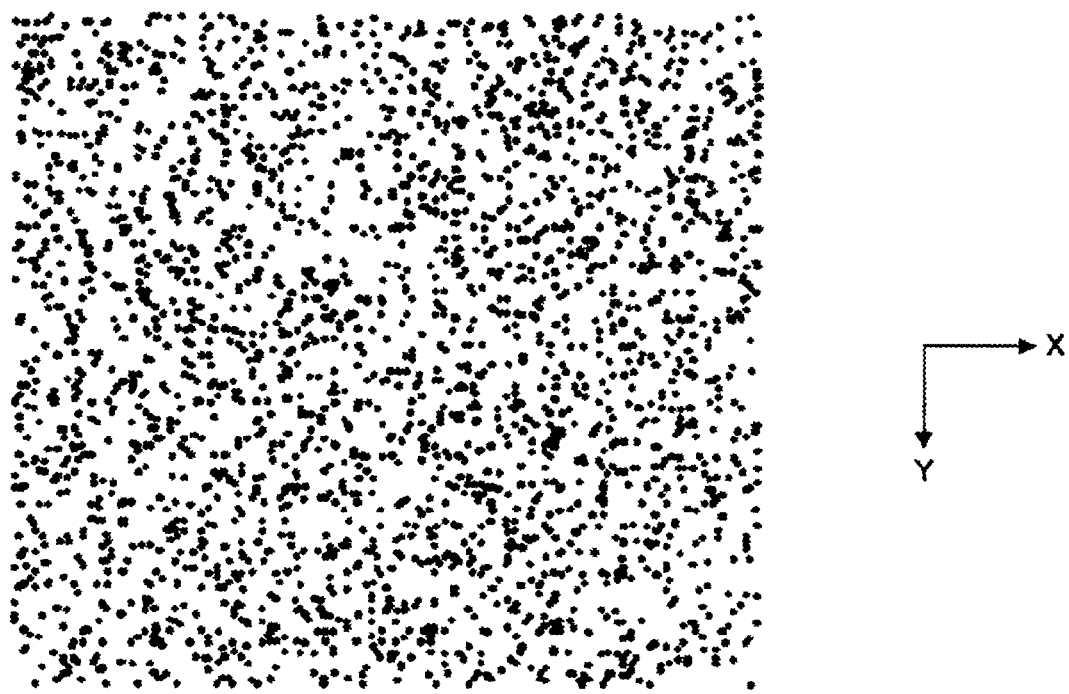
FIGS. 18A and 18B are explanation diagrams showing a diffractive optical element according to Comparison Example 2.
Figure 18B:
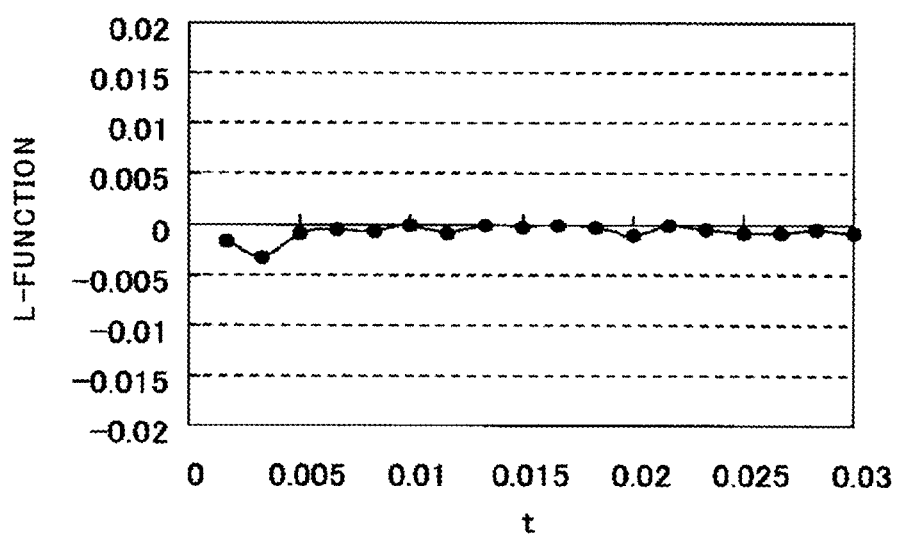

Next, Comparison Example 2 is described below with reference to FIGS. 18A and 18B. FIG. 18A shows a situation that 2500 light spots are generated at random by the diffractive optical element according to Comparison Example 2. As shown in FIG. 18A, the diffractive optical element according to Comparison Example 2 is formed such that predetermined diffraction ranges are divided into 250×250 and then a light spot is generated at random at each division point.

After normalization, into 1, of the area of the projection pattern shown in FIG. 18A, the average distance to the nearest neighbor is calculated to be approximately 0.01. This agrees with a statistically expected value of 0.01 for the average distance to the nearest neighbor. Further, FIG. 18B shows the L-function calculated for the diffractive optical element according to Comparison Example 2. The values of the L-function are near 0 in the range of 0.005<t<0.03. This indicates random distribution in the above-mentioned range.

Comparison Example 3

Figure 19A:
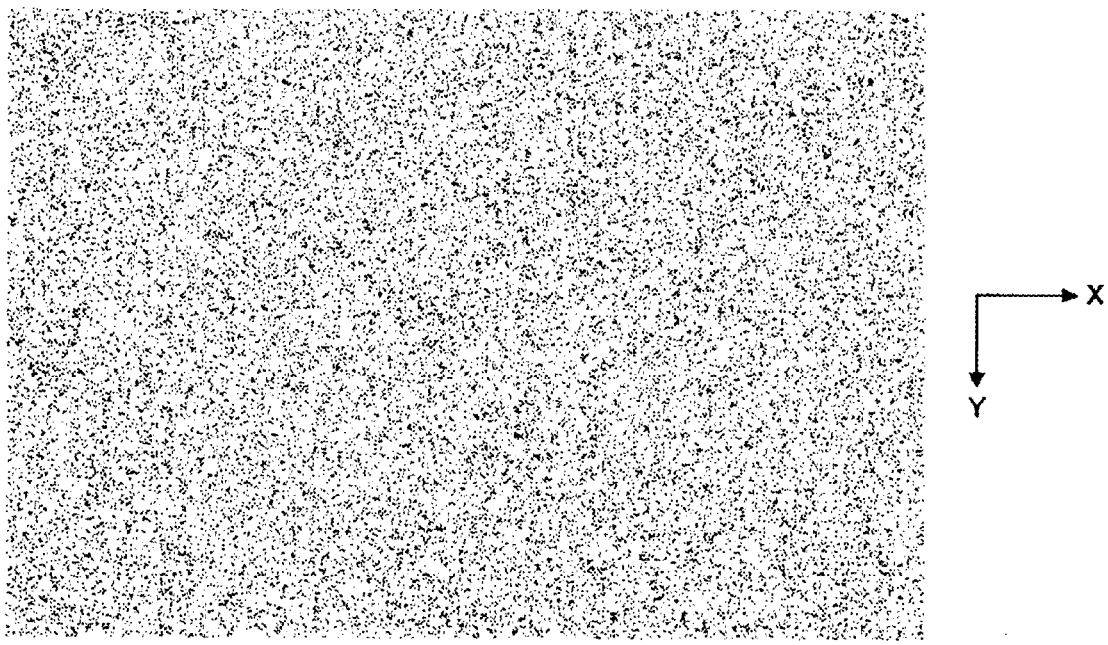
FIGS. 19A and 19B are explanation diagrams showing a diffractive optical element according to Comparison Example 3.
Figure 19B:
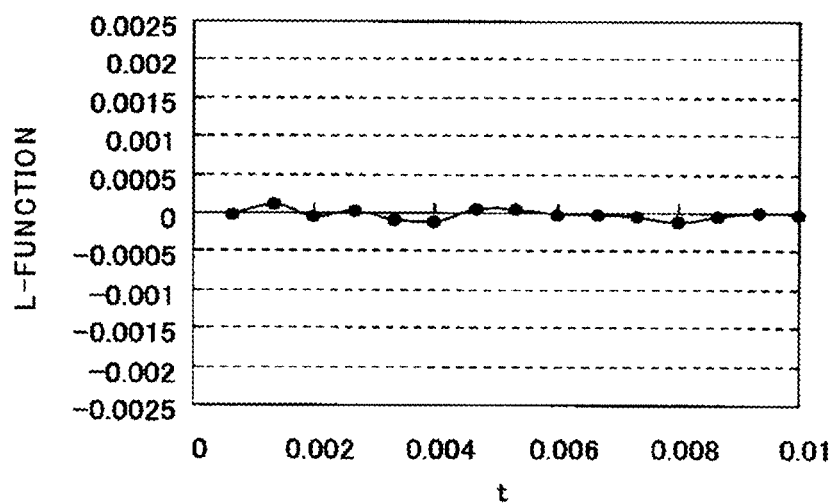

Next, Comparison Example 3 is described below with reference to FIGS. 19A and 19B. FIG. 19A shows a situation that 30000 light spots are generated at random by the diffractive optical element according to Comparison Example 3. As shown in FIG. 19A, the diffractive optical element according to Comparison Example 3 is formed such that predetermined diffraction ranges are divided into 2000×1500 and then a light spot is generated at random at each division point.

After normalization, into 1, of the area of the projection pattern shown in FIG. 19A, the average distance to the nearest neighbor is calculated to be 0.0029. This agrees with a statistically expected value of 0.0029 for the average distance to the nearest neighbor. Further, FIG. 19B shows the L-function calculated for the diffractive optical element according to Comparison Example 3. The values of the L-function are near in the range of 0.0015<t<0.01. This indicates random distribution in the above-mentioned range.

Comparison Example 4

Figure 20A:
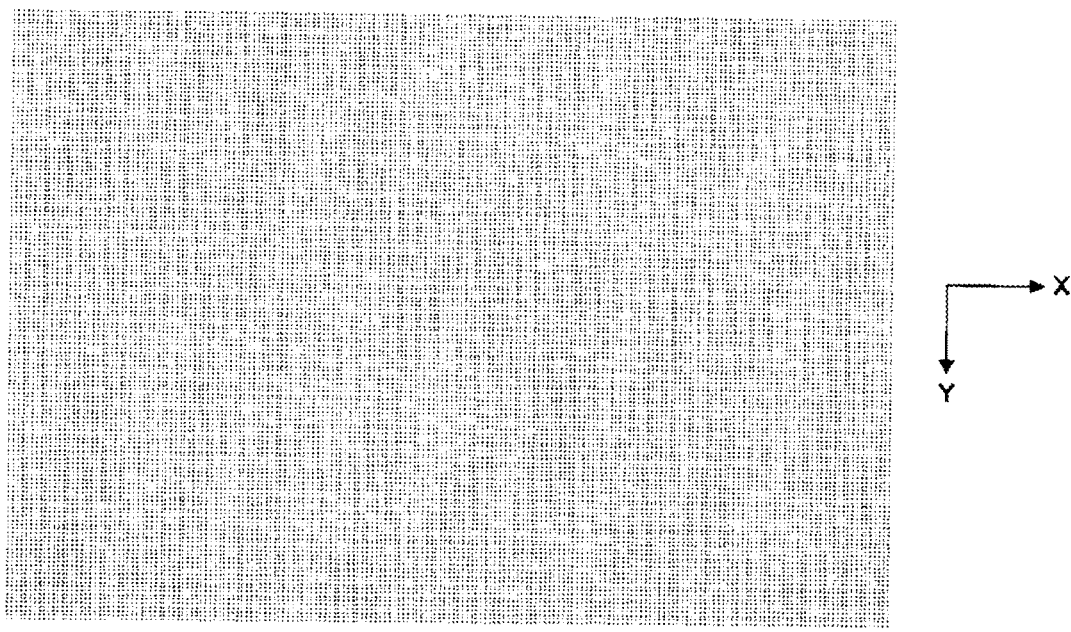
FIGS. 20A and 20B are explanation diagrams showing a diffractive optical element according to Comparison Example 4.
Figure 20B:
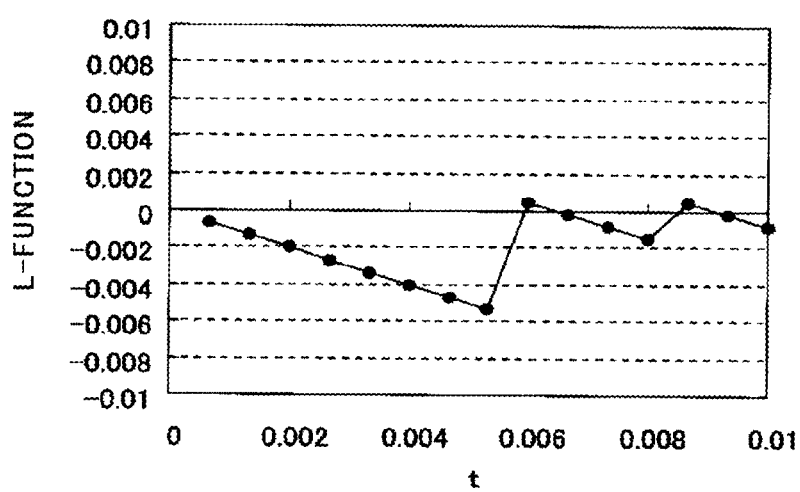

Next, Comparison Example 4 is described below with reference to FIGS. 20A and 20B. FIG. 20A shows a situation that 30000 light spots are generated regularly at grid points by the diffractive optical element according to Comparison Example 4. As shown in FIG. 20A, the diffractive optical element according to Comparison Example 4 is formed such that predetermined diffraction ranges are divided into 200×150 and then a light spot is generated regularly at each division point.

After normalization, into 1, of the area of the projection pattern shown in FIG. 20A, the average distance to the nearest neighbor has been calculated to be 0.0058. Here, in the present comparison example, the value for $1/(n^{1/2})$ is 0.0058 and agrees with the average distance to the nearest neighbor in the present comparison example. Further, FIG. 20B shows the L-function calculated for the diffractive optical element according to Comparison Example 4. The values of the L-function are smaller than or equal to 0 in the range of 0.0007<t<0.005, and hence indicate distribution of dispersive type in the above-mentioned range.

Figure 21:
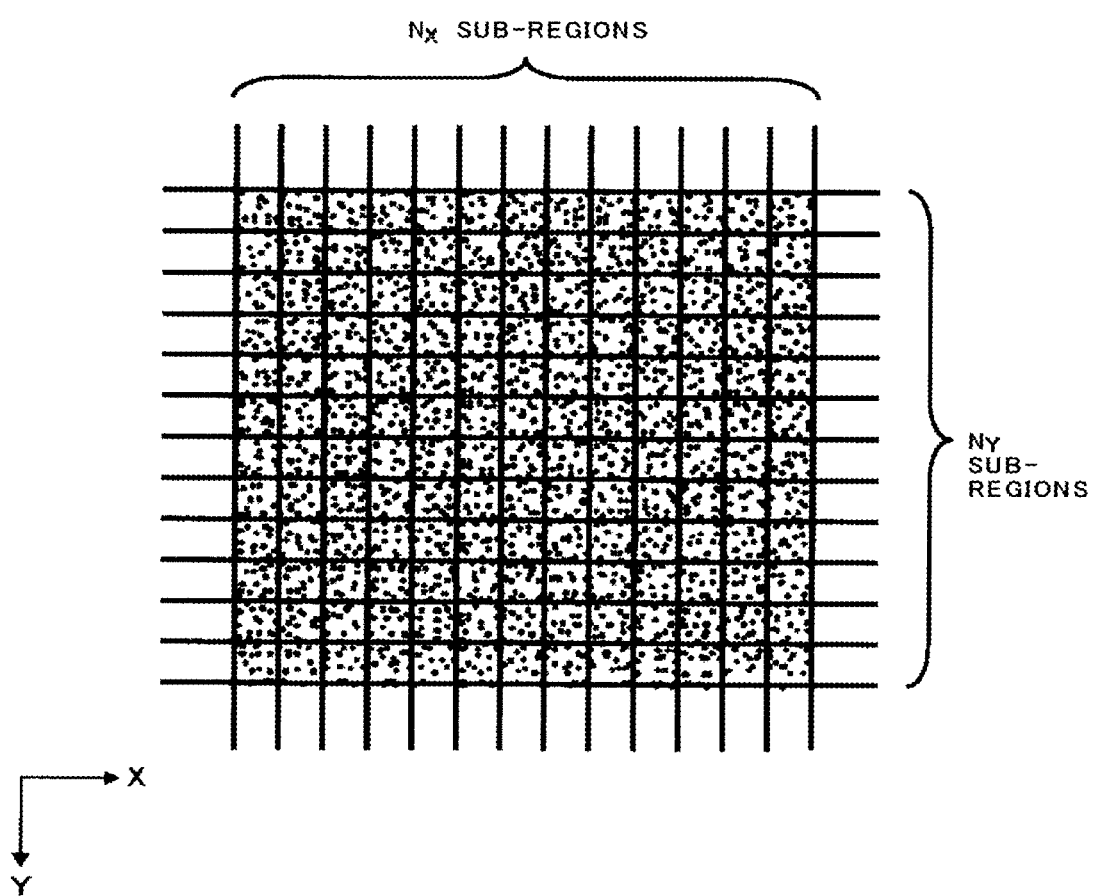
FIG. 21 is an explanation diagram showing a region to be divided in distribution of diffracted light.

Next, the results of Examples 1 to 3 and Comparison Examples 1 to 4 are discussed. First, in each of the examples and the comparison examples, the X-Y plane is supposed as ranges on which light spots are present. Then, regions are supposed that are obtained by dividing into $N_X$ in the X-direction and into $N_Y$ in the Y-direction at equal intervals. FIG. 21 shows a particular example in which light spots are provided on the X-Y plane and regions are generated by dividing into $N_X$ in the X-direction and into $N_Y$ in the Y-direction at equal intervals. Then, from the results of Examples 1 to 3 and Comparison Examples 1 to 4, the frequency of the number of light spots contained in each region has been investigated.

Figure 22A:
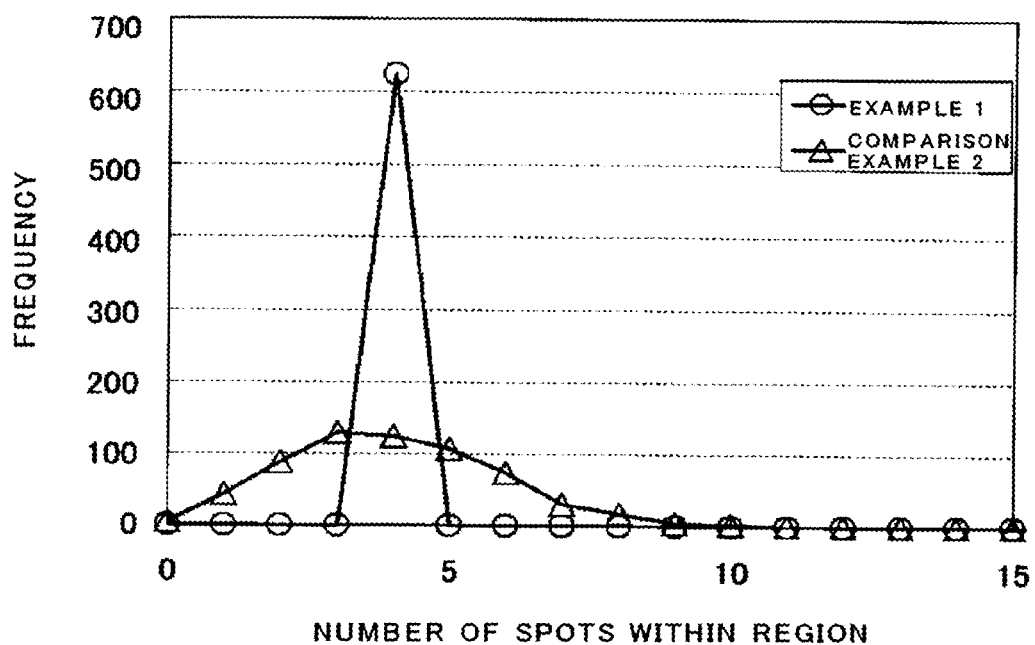
FIGS. 22A and 22B are graphs of the frequency of the number of light spots imparted to each sub-region in Examples 1 to 3 and in Comparison Examples 1 to 4.

First, in Example 1 and Comparison Examples 1 and 2 where the number of light spots are 2500, $N_X=25$ and $N_Y=25$ were employed so that the region is divided into 625 sub-regions. Then, the number of light spots contained in each region was investigated. Then, the frequency of the number is summarized in Table 1, and the histogram of this is shown in FIG. 22A.

TABLE 1

| Number of light spots | Frequency | | |
|---|---|---|---|
| | Example 1 | Comparison Example 1 | Comparison Example 2 |
| 0 | 0 | 0 | 5 |
| 1 | 0 | 0 | 43 |
| 2 | 0 | 0 | 88 |
| 3 | 0 | 0 | 129 |
| 4 | 625 | 625 | 124 |
| 5 | 0 | 0 | 107 |
| 6 | 0 | 0 | 74 |
| 7 | 0 | 0 | 31 |
| 8 | 0 | 0 | 17 |
| 9 | 0 | 0 | 4 |
| 10 | 0 | 0 | 3 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |

At that time, in the pattern of light spots generated by the diffractive optical element according to Example 1, four light spots are imparted to each region. In contrast, in the pattern of light spots generated by the diffractive optical element according to Comparison Example 2, among the sub-regions, sub-regions where the number of light spots is 0 are generated. Thus, when a diffractive optical element like that according to Comparison Example 2 is applied to a measuring device, a problem arises that no light spot is obtained in a particular region and hence an object portion present in this region cannot be measured. Thus, the resolution achieved by the diffractive optical element according to Example 1 is not obtained.

Further, in the pattern of light spots generated by the diffractive optical element according to Comparison Example 1, the number of light spots is not 0 in each sub-region. Nevertheless, since the pattern has regularity in the distribution of light spots, a problem arises that the pattern in the X-direction and the pattern in the Y-direction cannot be distinguished from each other. In particular, in a case that a three-dimensional measuring device for measuring the three-dimensional shape or the like of an object employs a diffractive optical element like that according to Comparison Example 1, when the measurement object moves in the depth direction or the like, a measurement error can occur that the positions in the X-direction and the Y-direction cannot be recognized.

Figure 22B:
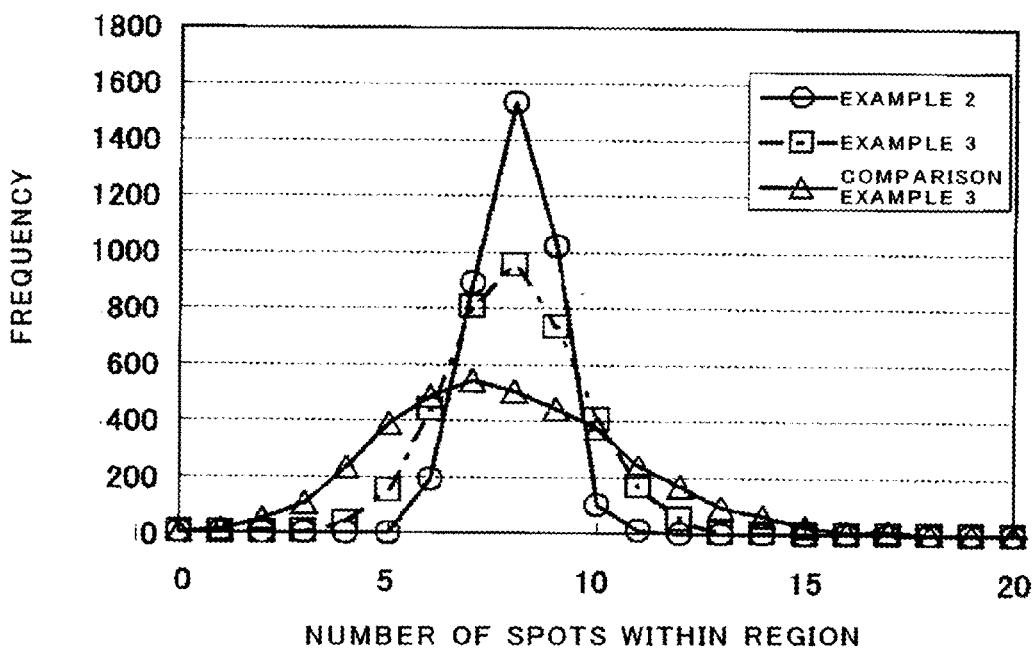

Next, in Examples 2 and 3 and Comparison Examples 3 and 4 where the number of light spots are 30000, $N_X=75$ and $N_Y=50$ were employed so that the region is divided into 3750 sub-regions. Then, the number of light spots contained in each region was investigated. Then, the frequency of the number is summarized in Table 2, and the histogram of this is shown in FIG. 22B.

TABLE 2

| Number of light spots | Frequency | | | |
|---|---|---|---|---|
| | Example 2 | Example 3 | Comparison Example 3 | Comparison Example 4 |
| 0 | 0 | 0 | 0 | 0 |
| 1 | 0 | 0 | 12 | 0 |
| 2 | 0 | 0 | 48 | 0 |
| 3 | 0 | 4 | 106 | 0 |
| 4 | 0 | 34 | 233 | 0 |
| 5 | 0 | 151 | 388 | 0 |
| 6 | 189 | 438 | 486 | 3750 |
| 7 | 890 | 803 | 542 | 0 |
| 8 | 1533 | 955 | 504 | 0 |
| 9 | 1023 | 735 | 442 | 0 |
| 10 | 101 | 404 | 376 | 0 |
| 11 | 13 | 167 | 239 | 0 |
| 12 | 1 | 53 | 169 | 0 |
| 13 | 0 | 4 | 94 | 0 |
| 14 | 0 | 2 | 63 | 0 |
| 15 | 0 | 0 | 28 | 0 |
| 16 | 0 | 0 | 9 | 0 |
| 17 | 0 | 0 | 11 | 0 |
| 18 | 0 | 0 | 0 | 0 |
| 19 | 0 | 0 | 0 | 0 |
| 20 | 0 | 0 | 0 | 0 |

At that time, in the pattern of light spots generated by the diffractive optical element according to Example 2, at least six light spots are imparted to each region. Further, in the pattern of light spots generated by the diffractive optical element according to Example 3, at least three light spots are imparted to each region. In contrast, in the pattern of light spots generated by the diffractive optical element according to Comparison Example 3, among the sub-regions, sub-regions where the number of light spots is 1 are generated. In particular, in the case of a diffractive optical element that generates 30000 light spots, the light intensity of each light spot is remarkably low. Thus, in a case that only a single spot is contained, measurement is not appropriately achieved in some cases depending on the surface state of the measurement object or the like. Thus, when a diffractive optical element like that according to Comparison Example 3 is applied to a measuring device, the resolution of measurement using light spots is degraded in a particular region. Further, an S/N ratio at a desired level is not achieved. Thus, the object cannot be measured with higher precision in comparison with the case of the diffractive optical element according to Example 2 or Example 3.

Further, in the pattern of light spots generated by the diffractive optical element according to Comparison Example 4, the number of light spots is not 0 or 1 in each sub-region. Nevertheless, similarly to Comparison Example 1, since the pattern has regularity in the distribution of light spots, a problem arises that the pattern in the X-direction and the pattern in the Y-direction cannot be distinguished from each other. In particular, in a case that a three-dimensional measuring device for measuring the three-dimensional shape or the like of an object employs a diffractive optical element like that according to Comparison Example 4, when the measurement object moves in the depth direction or the like, a measurement error can occur that the positions in the X-direction and the Y-direction cannot be recognized.

The mode of implementing the present invention has been described so far. However, the contents of the description given above do not limit the contents of the present invention.

What is claimed is:

1. A diffractive optical element having concaves and convexes and diffracting incident light in two dimensions so as to generate diffracted light, wherein
    when the number of a part or a whole of light spots formed by the diffracted light is denoted by n, an average distance W to the nearest neighbor in the light spots normalized by an area of a region onto which the light spots are projected falls within a range of $1/(2 \times n^{1/2}) < W < 1/(n^{1/2})$.

2. The diffractive optical element according to claim 1, wherein
    the region onto which the light spots are projected is a plane region or a spherical surface region.

3. The diffractive optical element according to claim 1, wherein
    the concaves and convexes are formed in the shape of two steps or alternatively three or more steps.

4. The diffractive optical element according to claim 1, wherein
    the diffracted light is transmission diffraction light of light having been incident onto the diffractive optical element, or alternatively the diffractive optical element has a reflecting layer composed of a material for reflecting light and the diffracted light is reflected light reflected by the reflecting layer.

5. A measuring device comprising:
    a light source; and
    an image pickup section for acquiring an image of a measurement object onto which light is projected, wherein
    light from the light source is branched and then when the number of a part or a whole of light spots formed by the branched light beams is denoted by n, an average distance W to the nearest neighbor in the light spots normalized by an area of a region onto which the light spots are projected falls within a range of $1/(2 \times n^{1/2}) < W < 1/(n^{1/2})$.

6. The measuring device according to claim 5, wherein
    the average distance W to the nearest neighbor is calculated from an image obtained by the image pickup section.

7. The measuring device according to claim 5, wherein
    the number of the light spots is 100 or greater.

8. A measuring device comprising:
    a light source; and
    an image pickup section for acquiring an image of a measurement object onto which light is projected, wherein:
    light from the light source is branched and then when the number of a part or a whole of light spots formed by the branched light beams is denoted by n, an average distance W to the nearest neighbor in the light spots normalized by an area of a region onto which the light spots are projected falls within a range of $1/(2 \times n^{1/2}) < W < 1/(n^{1/2})$; and
    the diffractive optical element according to any one of claims 1 to 4 is employed for diffracting the light from the light source so as to form the light spots.

9. The measuring device according to claim 8, wherein
    the average distance W to the nearest neighbor is calculated from an image obtained by the image pickup section.

10. The measuring device according to claim 8, wherein
    the number of the light spots is 100 or greater.

* * * * *